US010785925B2

(12) United States Patent
McNamara et al.

(10) Patent No.: US 10,785,925 B2
(45) Date of Patent: Sep. 29, 2020

(54) INSULATED SHIPPING CONTAINERS MODIFIED FOR HIGH-YIELD FUNGI PRODUCTION CAPABLE IN ANY ENVIRONMENT

(71) Applicant: Freight Farms, Inc., Boston, MA (US)

(72) Inventors: Brad McNamara, Boston, MA (US); Jon Friedman, Boston, MA (US)

(73) Assignee: FREIGHT FARMS, INC., Boston, MA (US)

( * ) Notice: Subject to any disclaimer, the term of this patent is extended or adjusted under 35 U.S.C. 154(b) by 0 days.

(21) Appl. No.: 16/240,902

(22) Filed: Jan. 7, 2019

(65) Prior Publication Data
US 2019/0133055 A1    May 9, 2019

Related U.S. Application Data

(63) Continuation of application No. 14/851,589, filed on Sep. 11, 2015, now Pat. No. 10,172,301.

(60) Provisional application No. 62/048,893, filed on Sep. 11, 2014.

(51) Int. Cl.
   *A01G 18/00*    (2018.01)
(52) U.S. Cl.
   CPC .................... *A01G 18/00* (2018.02)
(58) Field of Classification Search
   CPC ... A01G 9/14; A01G 9/00; A01G 9/24; A01G 9/246
   See application file for complete search history.

(56) References Cited

U.S. PATENT DOCUMENTS

| 3,343,300 | A | * | 9/1967 | Englert .................... A01G 9/00 47/17 |
| 3,931,695 | A | | 1/1976 | Widmayer |
| 4,569,150 | A | | 2/1986 | Carlson et al. |
| 4,914,858 | A | | 4/1990 | Nijssen et al. |
| 4,965,701 | A | | 10/1990 | Voland |
| 5,001,859 | A | | 3/1991 | Sprung |

(Continued)

FOREIGN PATENT DOCUMENTS

| GB | 2426015 A | 11/2006 |
| KR | 2020110009235 U | 9/2011 |

(Continued)

*Primary Examiner* — Kristen C Hayes
(74) *Attorney, Agent, or Firm* — Arent Fox LLP

(57) ABSTRACT

Techniques for generating high-yield fungi production are disclosed. In one particular embodiment, the techniques may be realized as a system for generating high-yield fungi production, the system comprising at least one modular container and a growing system housed within the modular container. The growing system may include a substrate preparation system configured to accept substrate and prepare substrate for pasteurization, a pasteurization system configured to pasteurize prepared substrate received from the substrate preparation system, a draining, cooling, and packing system configured to cool and drain pasteurized prepared substrate from the pasteurization system and to pack pasteurized and cooled substrate into at least one growing container, an inoculation system configured to inoculate the pasteurized and cooled substrate, and a plurality of vertical racks coupled to a ceiling of the modular container and configured to hold the at least one growing container.

15 Claims, 38 Drawing Sheets

(56) References Cited

U.S. PATENT DOCUMENTS

| | | |
|---|---|---|
| 5,252,108 A | 10/1993 | Banks |
| 5,283,974 A | 2/1994 | Graf, Jr. |
| 5,363,594 A | 11/1994 | Davis |
| 6,021,602 A | 2/2000 | Orsi |
| 9,288,948 B2 * | 3/2016 | McNamara ............... A01G 9/16 |
| 9,736,995 B2 * | 8/2017 | Pauls ....................... A01G 9/24 |
| 2004/0201988 A1 | 10/2004 | Allen |
| 2005/0281027 A1 | 12/2005 | Capen et al. |
| 2009/0025287 A1 | 1/2009 | Lee |
| 2009/0199470 A1 | 8/2009 | Capen et al. |
| 2009/0307973 A1 | 12/2009 | Adams et al. |
| 2010/0001664 A1 | 1/2010 | Shih |
| 2010/0134025 A1 | 6/2010 | Link |
| 2011/0232186 A1 * | 9/2011 | Lewis ..................... A01G 31/06 47/66.6 |
| 2012/0054061 A1 | 3/2012 | Fok et al. |
| 2013/0118070 A1 | 5/2013 | Marquez |
| 2013/0255146 A1 * | 10/2013 | Lehman ................. A01G 31/00 47/17 |
| 2014/0000162 A1 | 1/2014 | Blank |
| 2014/0115958 A1 * | 5/2014 | Helene ..................... A01G 9/14 47/17 |
| 2014/0165468 A1 | 6/2014 | Roeser |
| 2014/0283452 A1 * | 9/2014 | Dittman ................. A01G 31/06 47/62 R |
| 2016/0066515 A1 * | 3/2016 | Palmieri, Jr. .......... A01G 9/241 47/17 |
| 2016/0066516 A1 * | 3/2016 | Palmieri, Jr. ............ A01G 9/24 47/17 |
| 2016/0324077 A1 * | 11/2016 | Frantzen ................. H02S 30/20 |

FOREIGN PATENT DOCUMENTS

| | | |
|---|---|---|
| WO | 2004047521 A1 | 6/2004 |
| WO | 2005079557 A1 | 9/2005 |

* cited by examiner

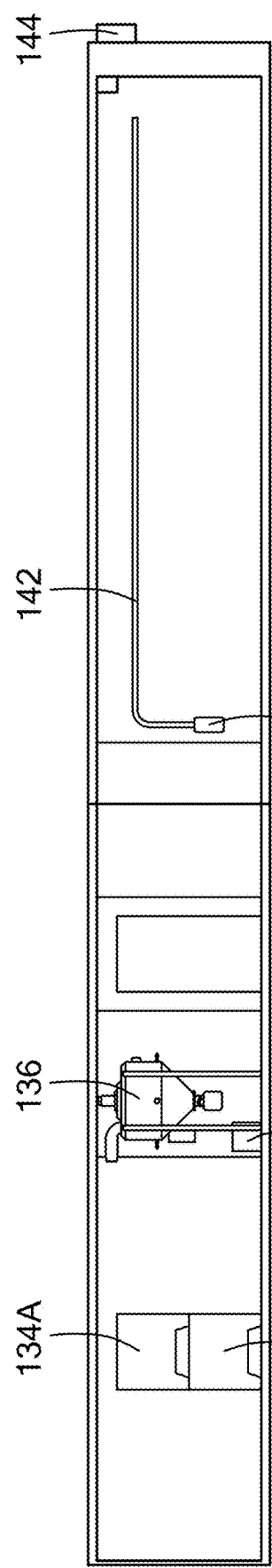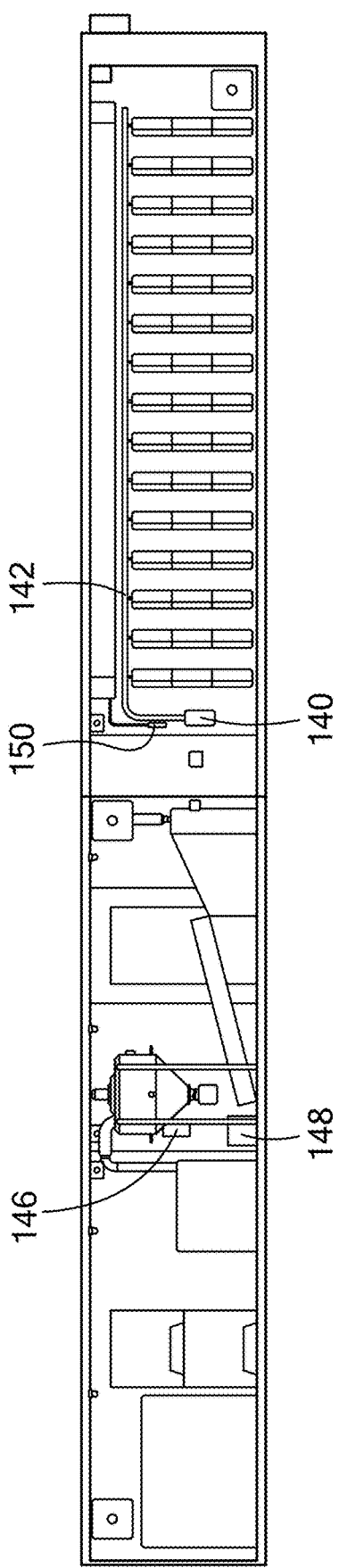

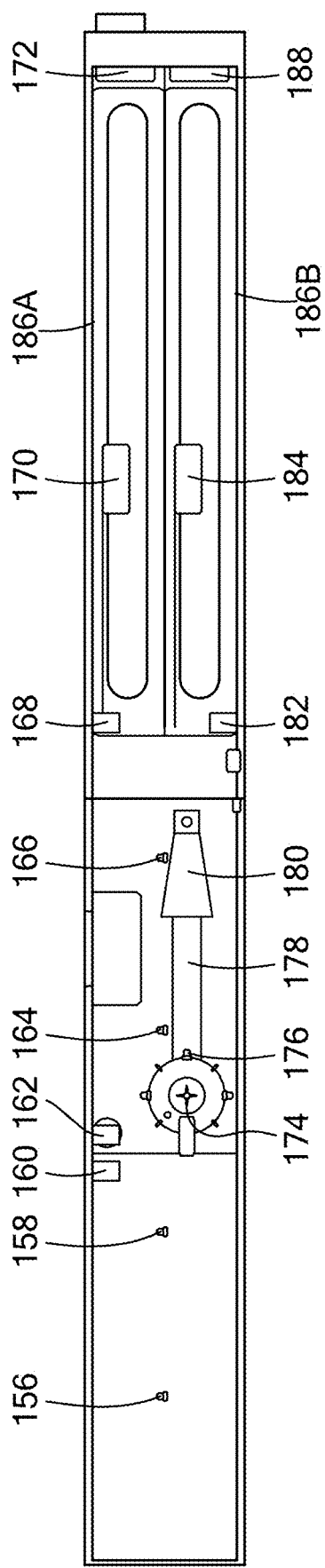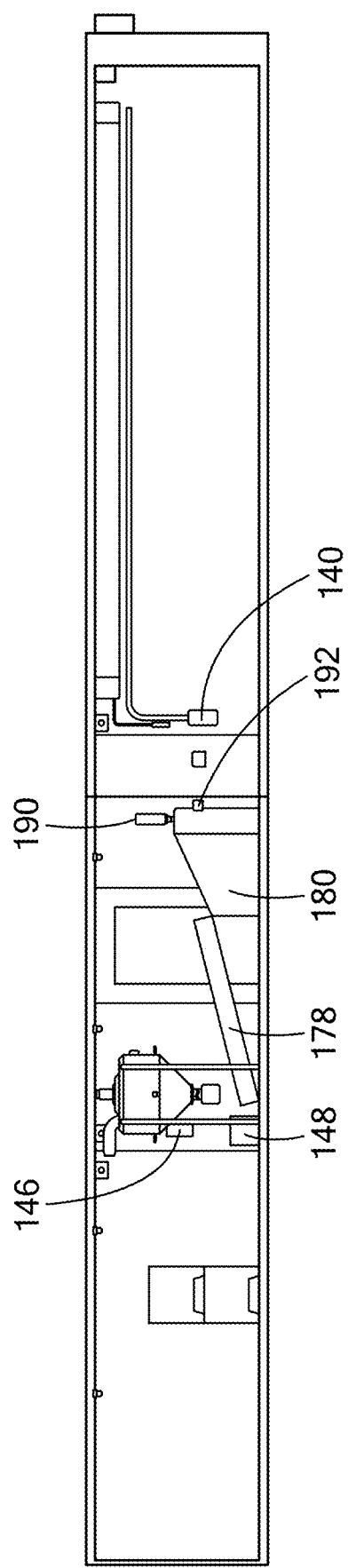
FIG. 1E
FIG. 1F

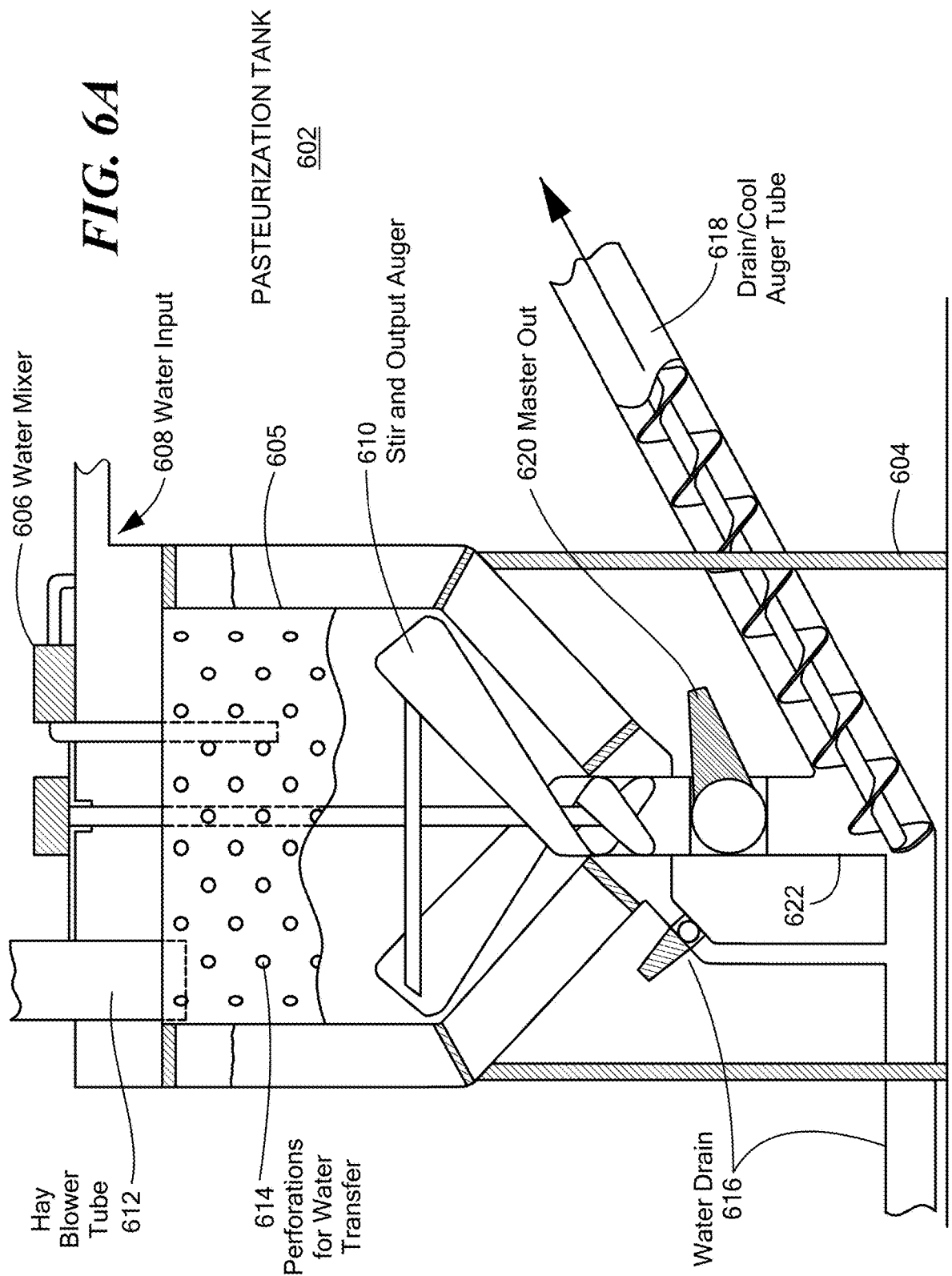

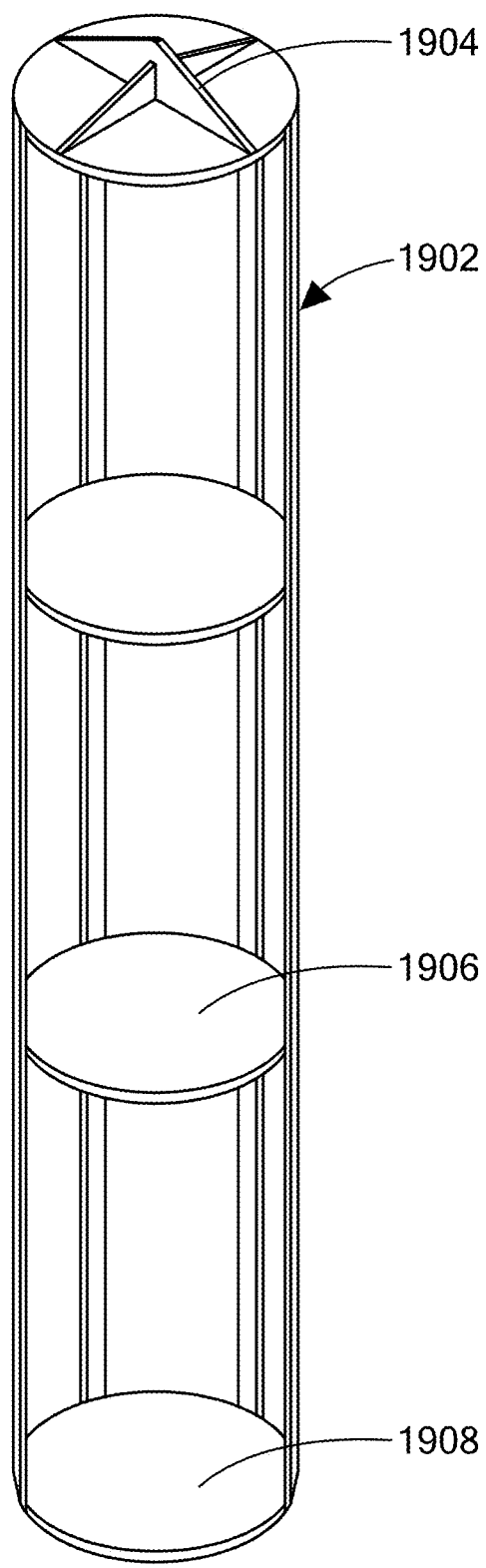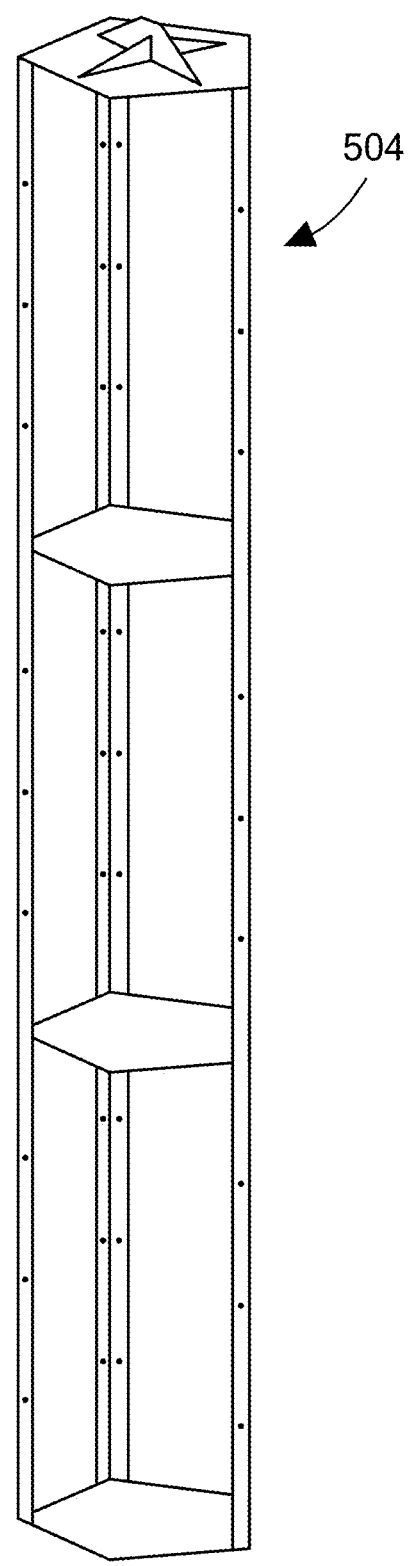
*FIG. 19A*  *FIG. 19B*

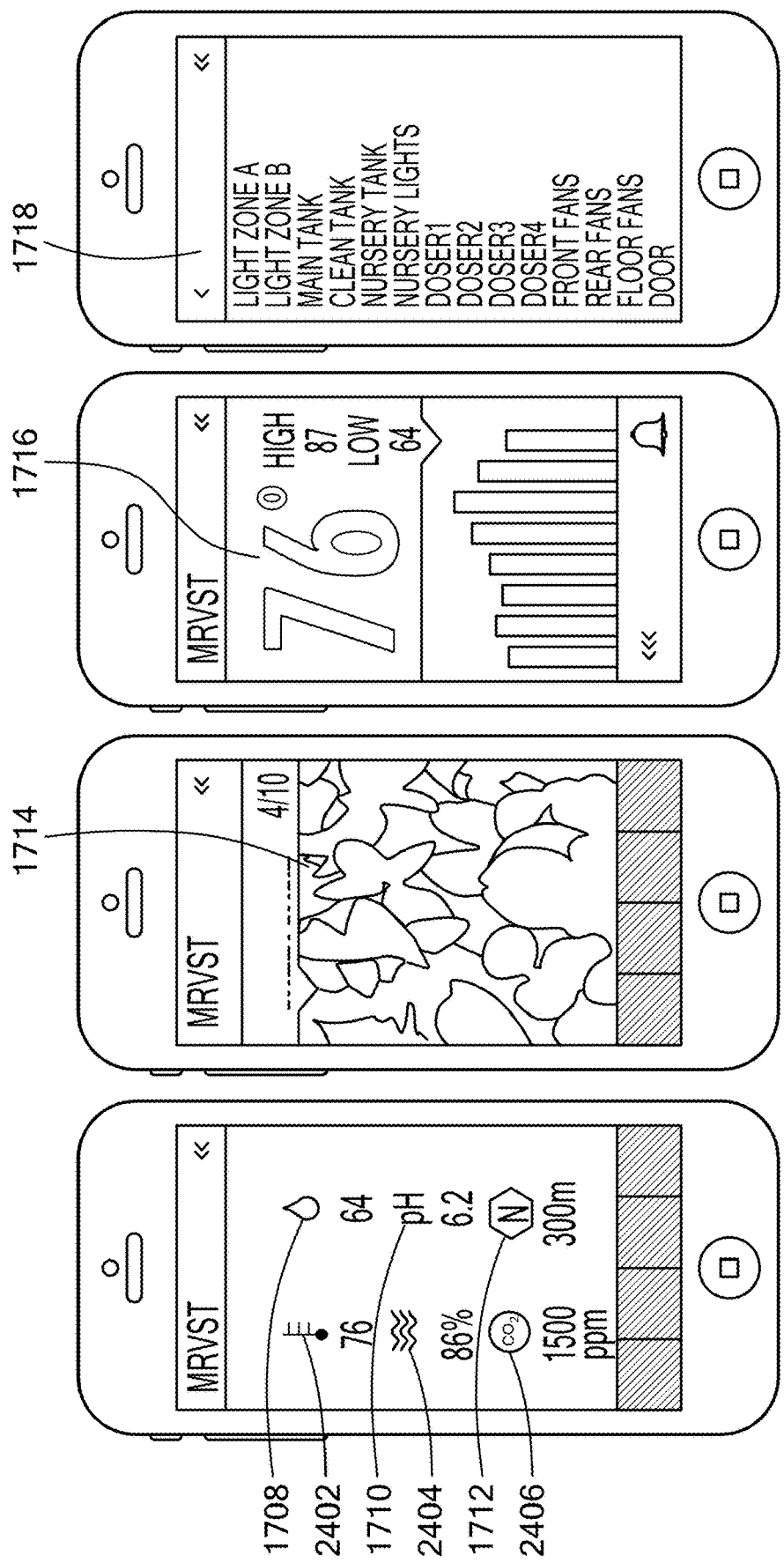

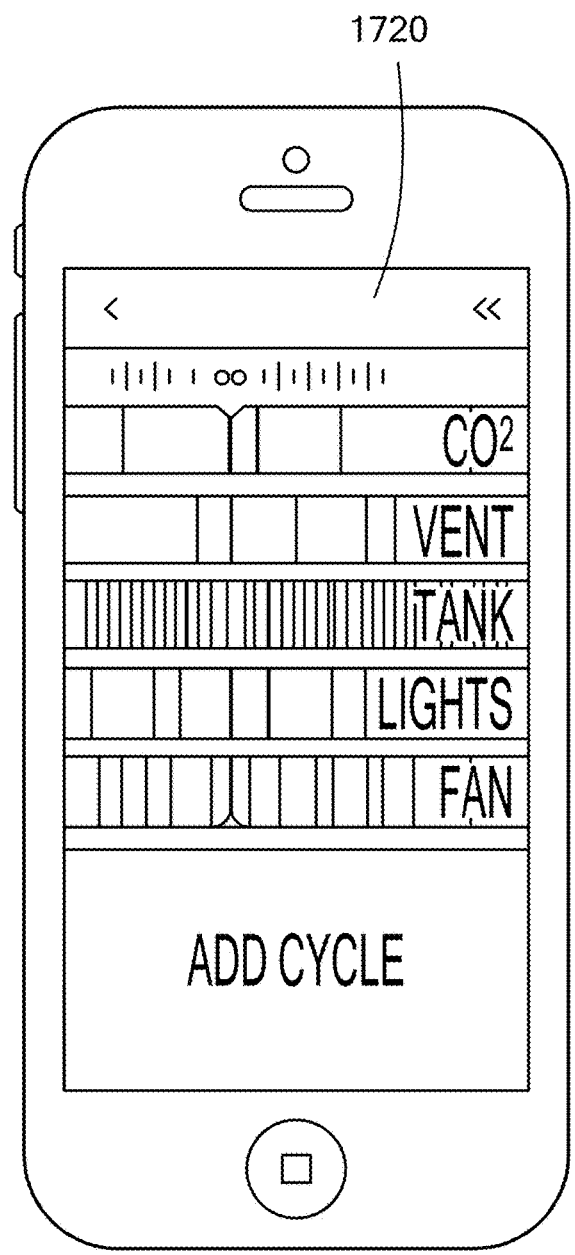
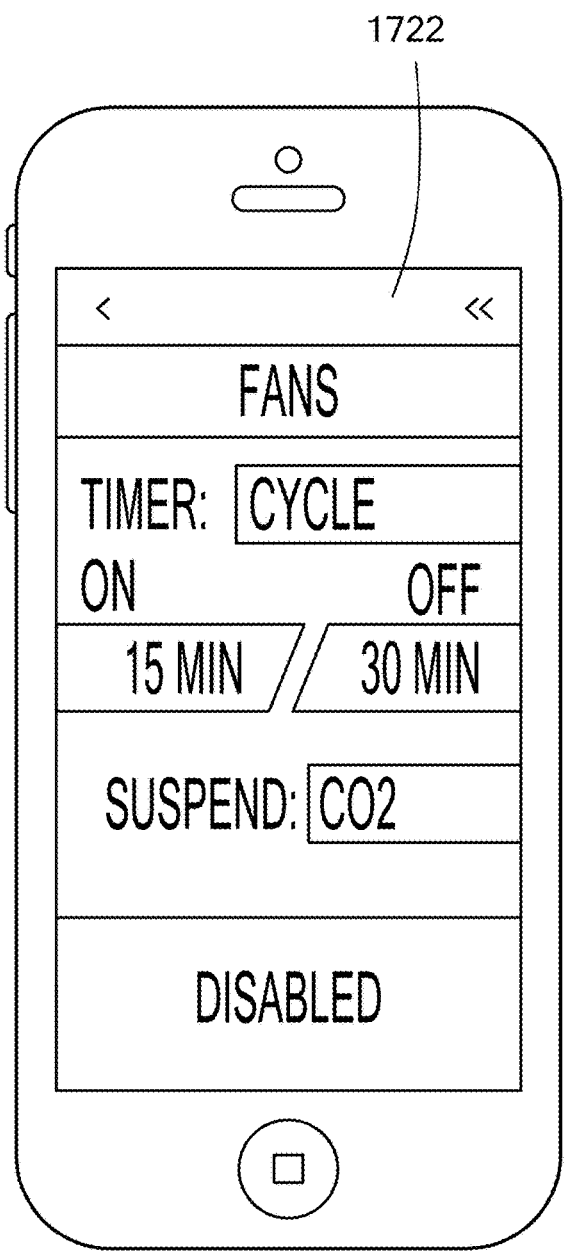
*FIG. 25A*  *FIG. 25B*

INSULATED SHIPPING CONTAINERS MODIFIED FOR HIGH-YIELD FUNGI PRODUCTION CAPABLE IN ANY ENVIRONMENT

CROSS REFERENCE TO RELATED APPLICATIONS

This application is a continuation application of U.S. application Ser. No. 14/851,589, filed Sep. 11, 2015, entitled "Insulated Shipping Containers Modified for High-Yield Fungi Production Capable in Any Environment," which claims benefit under 35 U.S.C. § 119(e) to U.S. Provisional Application No. 62/048,893, entitled "Insulated Shipping Containers Modified for High-yield Fungi Production Capable in Any Environment," filed Sep. 11, 2014, the contents of both of which are incorporated by reference herein in their entirety.

BACKGROUND

Field

The present disclosure relates to insulated modular containers modified for high-yield fungi production in any environment.

Description of Related Art

The need for fresh food, including fungi such as mushrooms, is growing as the population increases and changes in the climate impact growing seasons. The current food supply model is economically and environmentally unsustainable because of traditional farming methods and shipping. Operations are usually located in agricultural areas, which still require transportation to distribute their produce. These types of operations require large upfront costs and rely on larger acreage, and have high operational costs from spore to sale. For example, sending fresh food an average of 1500 miles is extremely complicated and adds major expense to a customer's supply chain.

Traditional urban/local agriculture is not the solution as it has the problem of commercial viability for the cultivation of fungi. First, there is limited growing space to meet a high demand. Second, high start-up costs of fungi growing facilities makes local crop production impossible for most businesses. For example, structures must be evaluated by structural engineers and often require additional bracing to support the weight. Operational costs of commercial agriculture also require additional labor and infrastructural costs. Third, urban growing facilities must survey and address contaminated soil which is further costly and time consuming. Offsite operations require additional labor and supplies to reach the same volume, and re-packaging and shipping is an added operating cost.

Traditional fungi growing systems are not the general solution either as most systems are meant to be installed in agricultural settings, are not easily transportable, and require years of education and training.

SUMMARY

The present disclosure relates to a compact modular container capable of high-yield fungi production in any environment, that can be operated by the average person with no prior experience or minimal training.

In some embodiments, the disclosed system can be a system that requires minimal infrastructure to begin operation and use. The system can then be easily expanded in a modular manner to fit and operate in any environment. For example, the system can be configured to expand vertically and/or horizontally to supply a neighborhood or an entire city.

In some embodiments, the system can be automated and includes a simplified user-interface for anyone to manage and operate. The user-interface allows a user to control the internal environment in order to provide optimal production conditions by eliminating environmental variables.

With a minimal amount of training, this system enables each customer to operate multiple units, grow food, and make a profit. At a low price point, customers can supplement crops that are shipped from across the world, and use local high-volume food production to reduce the economic and environmental footprint of food.

Techniques for high-yield fungi production are disclosed. In some embodiments, the techniques may be realized as a system for generating high-yield fungi production. The system may include at least one modular container and a growing system housed within the modular container. The growing system may include a substrate preparation system configured to accept substrate and prepare substrate for pasteurization, a pasteurization system configured to pasteurize prepared substrate received from the substrate preparation system, and a draining, cooling, and packing system configured to cool and drain pasteurized prepared substrate from the pasteurization system and to pack pasteurized and cooled substrate into at least one growing container. The growing system may further include an inoculation system configured to inoculate the pasteurized and cooled substrate, a plurality of vertical racks coupled to a ceiling of the modular container and configured to hold the at least one growing container, a misting system configured to provide humidity and water to the at least one growing container, a climate control system configured to control environmental conditions inside the modular container, a ventilation system configured to provide the at least one growing container with airflow, and a monitoring system coupled to the growing system. The monitoring system may be configured to monitor and control the pasteurization system, climate control system, ventilation system and misting system in order to maintain a set of conditions prescribed by a user, wherein the monitoring system may be configured to provide the user with real-time alerts and access to the growing system.

In accordance with other aspects of this particular embodiment, the system may further include a lighting system coupled to a ceiling of the modular container and configured to provide artificial light for the at least one growing container.

In accordance with further aspects of this particular embodiment, the system may be further configured to monitor a level of $CO_2$ within the modular container.

In some embodiments, the system may further be configured to control a level of $CO_2$ within the modular container.

In some embodiments, the pasteurization system may include an inner tank and an outer tank, wherein the outer tank includes a heater and a water drain and wherein the inner tank is configured to hold substrate material and the inner tank is positioned within the outer tank, the inner tank containing one or more openings allowing water circulation between the inner tank and the outer tank.

In some embodiments, the draining, cooling, and packing system may include an auger at least partially within the inner tank, wherein the auger is operable to agitate substrate materials in the inner tank and to facilitate drainage of water from the inner tank to the outer tank via at least one opening in the inner tank, a drain in the outer tank operable to permit drainage of water from the outer tank, an inclined draining and cooling tube to convey pasteurized substrate from the inner tank, a valve connected to the inner tank at a first end and connected to a lower end of the inclined draining and cooling tube at a second end, wherein the valve is operable to control a flow of substrate from inner tank to the inclined draining and cooling tube, an auger within the inclined cooling and draining tube operable to convey pasteurized substrate from the lower end of the inclined drain and cool tube to an upper end of the inclined drain and cool tube, a drain connected to a lower end of the inclined drain and cool tube, the drain operable to receive water draining from the inclined drain and cool tube, and a packing supply tube connected at a proximate end to the upper end of the inclined drain and cool tube and operable to convey pasteurized substrate from the proximate end to a distal end, the packing supply tube including at least one sealing wall operable to control a flow of pasteurized substrate through the packing supply tube.

In some embodiments, the inoculation system may include at least one needle configured to inoculate the pasteurized and cooled substrate with a liquid culture.

In some embodiments, the inoculation system may include an inclined hollow tube oriented to inoculate the pasteurized and cooled substrate with grain spawn, the inclined tube having a closure operable to control a flow of the grain spawn to the pasteurized and cooled substrate.

In some embodiments, the modular container may include a plurality of dividers separating the modular container into a plurality of areas.

In some embodiments, the plurality of areas may include at least two growing areas, a preparation area, and an airlock operable to reduce contamination to the growing system from outside of the modular container, wherein the airlock provides the user access to the preparation area from outside of the modular container.

In some embodiments, the plurality of vertical racks coupled to the ceiling of the modular container may be coupled to the ceiling of the modular container via a conveyor.

In some embodiments, the conveyor may support the plurality of vertical racks within a growing area and the conveyor may provide the user access to the plurality of vertical racks from a preparation area.

In some embodiments, the monitoring system may further include a control center, CPU interface, and wireless interface.

In some embodiments, the monitoring system can be configured to remotely provide the user with data on the growing system.

In some embodiments, the monitoring system may be configured to allow the user to remotely alter the performance of at least one of the misting system, the climate control system, and the ventilation system, in order to maintain the set of conditions prescribed by the user.

In another particular embodiment, the techniques may be realized as a method for generating high-yield fungi production in any environment. The method may include configuring at least one modular container for fungi cultivation and assembling a growing station within the modular container. Assembling the growing station may include assembling a substrate preparation system configured to accept substrate and prepare substrate for pasteurization, assembling a pasteurization system configured to pasteurize prepared substrate received from the substrate preparation system, and assembling a draining, cooling, and packing system configured to cool and drain pasteurized prepared substrate from the pasteurization system and to pack pasteurized and cooled substrate into at least one growing container. The techniques may include assembling an inoculation system configured to inoculate the pasteurized and cooled substrate in the at least one growing container, assembling a plurality of vertical racks coupled to the ceiling of the modular container and configured to hold the at least one growing container, assembling a misting system configured to provide humidity and water to the at least one growing container, and assembling a climate control system configured to control environmental conditions inside the modular container. The techniques may also include assembling a ventilation system configured to provide the inoculated substrate with airflow and coupling a monitoring system to the growing system. The monitoring system may be configured to monitor and control the pasteurization system, climate control system, ventilation system and misting system in order to maintain a set of conditions prescribed by a user. The monitoring system may also be configured to provide the user with real-time alerts and access to the growing system.

In some embodiments, the techniques may further include providing a lighting system coupled to a ceiling of the modular container and configured to provide artificial light for the at least one growing container.

In some embodiments, the techniques may further include monitoring a level of $CO_2$ within the modular container.

In some embodiments, the techniques may further include controlling a level of $CO_2$ within the modular container.

In some embodiments, the pasteurization system may include an inner tank and an outer tank, wherein the outer tank may include a heater and a water drain and wherein the inner tank may be configured to hold substrate material and the inner tank may be positioned within the outer tank, and the inner tank may contain one or more openings allowing water circulation between the inner tank and the outer tank.

In some embodiments, the draining, cooling, and packing system may include an auger at least partially within the inner tank. The auger may be operable to agitate substrate materials in the inner tank and to facilitate drainage of water from the inner tank to the outer tank via at least one opening in the inner tank. The draining, cooling, and packing system may also include a drain in the outer tank operable to permit drainage of water from the outer tank, an inclined draining and cooling tube to convey pasteurized substrate from the inner tank, and a valve connected to the inner tank at a first end and connected to a lower end of the inclined draining and cooling tube at a second end, The valve may be operable to control a flow of substrate from inner tank to the inclined draining and cooling tube. The draining, cooling, and packing system may include an auger within the inclined cooling and draining tube operable to convey pasteurized substrate from the lower end of the inclined drain and cool tube to an upper end of the inclined drain and cool tube, a drain connected to a lower end of the inclined drain and cool tube, the drain operable to receive water draining from the inclined drain and cool tube, and a packing supply tube connected at a proximate end to the upper end of the inclined drain and cool tube. The packing supply tube may be operable to convey pasteurized substrate from the proximate end to a distal end. The packing supply tube may include at least one sealing wall operable to control a flow of pasteurized substrate through the packing supply tube.

In some embodiments, the inoculation system may include at least one needle configured to inoculate the pasteurized and cooled substrate with a liquid culture.

In some embodiments, the inoculation system may include an inclined hollow tube oriented to inoculate the pasteurized and cooled substrate with grain spawn. The inclined tube may include a closure operable to control a flow of the grain spawn to the pasteurized and cooled substrate.

In some embodiments, the modular container may include a plurality of dividers separating the modular container into a plurality of areas.

In some embodiments, the plurality of areas may include at least two growing areas, a preparation area, and an airlock operable to reduce contamination to the growing system from outside of the modular container, wherein the airlock provides the user access to the preparation area from outside of the modular container.

In some embodiments, the plurality of vertical racks coupled to the ceiling of the modular container may be coupled to the ceiling of the modular container via a conveyor.

In some embodiments, the conveyor may support the plurality of vertical racks within a growing area and the conveyor may provide the user access to the plurality of vertical racks from a preparation area.

In some embodiments, the monitoring system may further include a control center, CPU interface, and wireless interface.

In some embodiments, the monitoring system may be configured to remotely provide the user with data on the growing system.

In some embodiments, the monitoring system may be configured to allow the user to remotely alter the performance of at least one of the misting system, the climate control system, and the ventilation system, in order to maintain the set of conditions prescribed by the user.

In another embodiment, the techniques may be realized as a method for high-yield fungi production in any environment. The method may include preparing substrate for pasteurization using an apparatus for chopping the substrate, providing the chopped substrate to a pasteurization apparatus, and pasteurizing the substrate using a heated solution in a pasteurization container. The pasteurization container may be configured to receive a specified amount of substrate, a specified amount of pasteurization solution, and to heat the substrate for a specified duration. The techniques may further include automatically providing the pasteurized substrate to a draining and cooling apparatus, inoculating a cooled and drained substrate with at least one of: a grain spawn and a liquid culture, packing pasteurized and inoculated substrate into at least one growing bag, placing the at least one growing bag on a vertical rack coupled to a ceiling of a modular container configured to provide a fungi growing environment, and automatically monitoring and managing environmental conditions of the modular container.

BRIEF DESCRIPTION OF THE DRAWINGS

The present disclosure will further be described by way of example and with reference to the following drawings, in which:

FIG. 1C shows a perspective sectional view of an illustrative growing container according to an embodiment of the disclosure.

FIG. 1D shows a perspective sectional view of an illustrative growing container according to an embodiment of the disclosure.

FIG. 1E shows a perspective sectional view of an illustrative growing container according to an embodiment of the disclosure.

FIG. 1F shows a perspective sectional view of an illustrative growing container according to an embodiment of the disclosure.

FIG. 6A illustrates a substrate pasteurization system according to an embodiment of the disclosure.

FIG. 19A depicts a growth medium support structure according to an embodiment of the disclosure.

FIG. 19B depicts a growth medium support structure according to an embodiment of the disclosure.

FIGS. 24A, 24B, 24C, and 24D show examples of additional data that can be remotely monitored and controlled via the illustrative monitoring system, all according to embodiments of the disclosure.

FIGS. 25A-25B show examples of further data that can be remotely monitored and controlled via the illustrative monitoring system, all according to embodiments of the disclosure.

DESCRIPTION

The present disclosure is directed to a system and method for modifying a modular container for high-yield fungi production in any environment. In one embodiment, a system can expand to fit any space, and be subsequently started and operated by an individual with minimal training. Another embodiment allows the user to monitor and modify the environment and feeding conditions in order to provide optimal growth conditions for the specific type of fungi being grown.

Figure 1A:
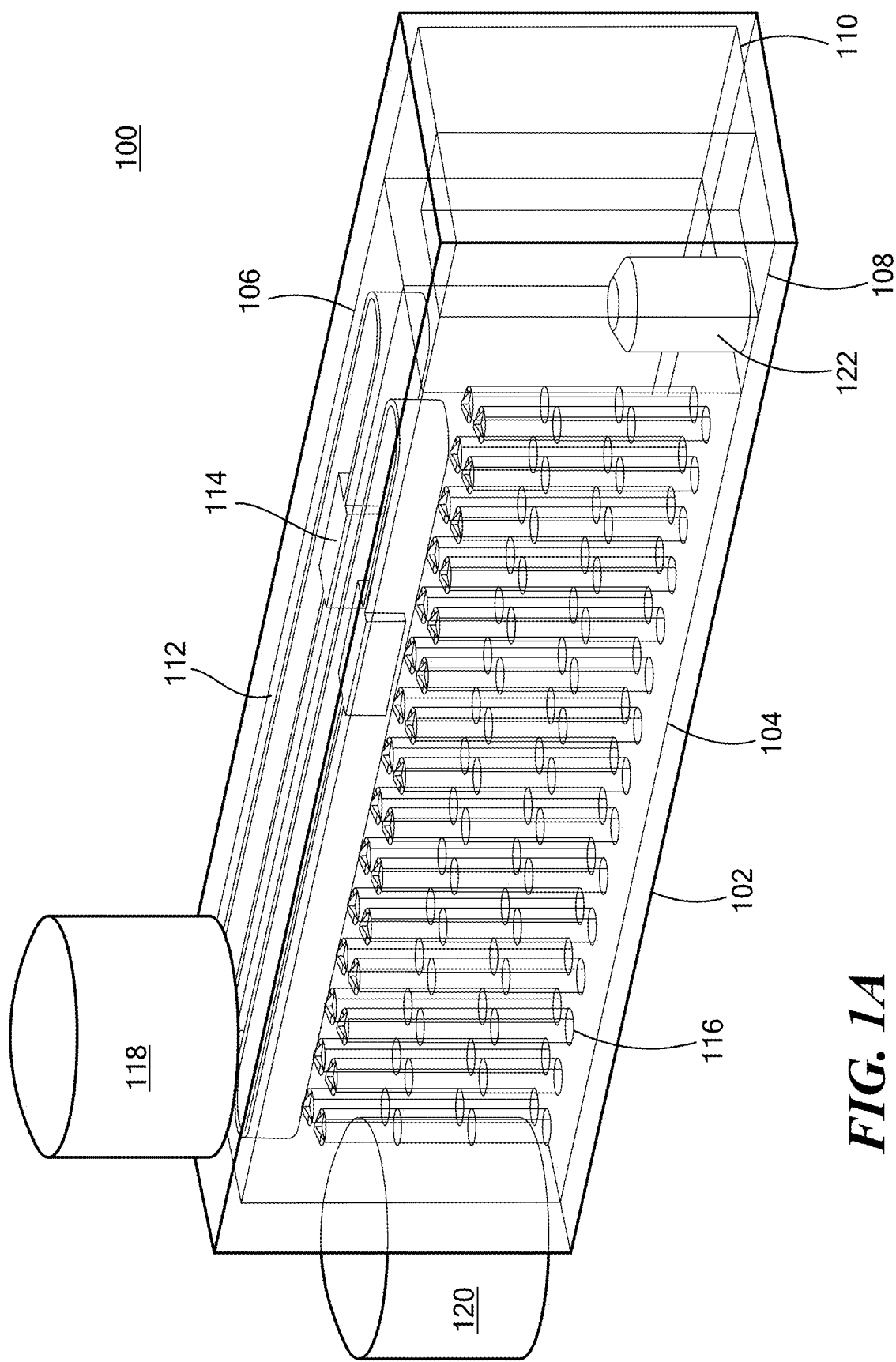
FIG. 1A shows a perspective sectional view of an illustrative growing container according to an embodiment of the disclosure.

FIG. 1A shows a perspective sectional view of an illustrative growing container 102 according to an embodiment of the disclosure. In another embodiment, container 102 can also include a water reclamation system (not shown). Container 102 can be a recycled shipping container with standard transnational grade intermodal perishable food-grade insulation foam sandwiched between the steel walls of container 102. Container 102 may also be sealed in order to create a solid modular frame for expansion, as well as a controlled growing environment for fungi.

In some embodiments, container 102 can be modified to include a solar array to harness solar energy and store it in a converter or batteries for later use. One of ordinary skill in the art would recognize that other energy efficient solutions, such as insulation paint or additional crops on top of and around container 102, can also be incorporated into container 102 to make it even more energy efficient. Other renewable energy technologies, such as forms of solar and wind power, could also be added to increase functionality. All of these components can be relocated within the unit, outside the unit, on top of the unit, or next to the unit, to increase space, efficiency, and/or ease of access.

As depicted in FIG. 1A, container 102 may include one or more vessels 118, 120 and 122. According to some embodiments, vessel 120 may store substrate for preparation for growth of fungi. Substrate may include one or more mediums capable of accepting fungi spore and supporting growth of fungi (e.g., straw, wood chips, sawdust, cardboard, coffee grounds, and other cellulose-based substrates.) Vessel 118 may store substrate during a pasteurization process. Vessel 122 may store water or other liquids for misting or other application to fungi in container 102. Container 102 may be subdivided into a plurality of different areas, such as, for example, grow area 104, grow area 106, airlock 108, and preparation area 110. Grow areas may contain conveyors, carousels, or other transportation systems for moving hanging growing modules. For example, conveyor 112 may support one or more hanging growing modules 116. Conveyor 112 may be powered by a motor 114, which may provide for the movement of one or more hanging growing modules 116 Hanging growing modules 116 may contain one or more platforms for carrying substrate for growing fungi. Other systems and/or components (not shown) may be included in container 102 (e.g., an LED lighting system, an irrigation system, a ventilation system, etc.). In order to control the internal environment of container 102, the system can include a climate control system that can measure and control humidity, carbon dioxide levels, temperature, and other related environmental factors.

In some embodiments, the system also can include a ventilation system having a main fan and a plurality of intermittent fans. Intermittent fans may be optional, additional fans which can be installed (e.g., every ten to twenty feet) to allow for additional air circulation. The ventilation system can include main fans, intermittent fans, and/or air vents. External air may be taken in by main fans at one end of container 102, and may be pushed through container 102 via intermittent fans, and then exhausted from container 102 at the opposite end. Intake air may be run through several High Efficiency Particulate Air (HEPA) charcoal filters at main fans and exhaust air may be run through micro screen charcoal filters. In some embodiments, ventilation system may utilize additional air vents coupled to a ceiling of container 102 to create a dual airflow system. Dual airflow system may be generated from the vertical air flow from vents 504 and horizontal air flow from main fans 502 and intermittent fans 1302. In other embodiments of the disclosure, additional fans and/or vents may be positioned in or on the floor of container 102 to blow air vertically from the ground up between rows of hanging growing modules.

Providing air flow in more than one direction is preferable in order to further create actual conditions that fungi would encounter outdoors. Furthermore, the chaotic and random air flow patterns that are generated stimulate the fungi and force them to grow stronger and denser stems. In embodiments of the disclosure, the vertical configuration of the racks along with the added vertical flow of air allows for air flow through the fungi and maintains a constant flow. Furthermore, the added vertical air flow, on top of the existing horizontal air flow, directly cools lighting while also providing an ideal level of stress to the fungi.

In one embodiment, assembly of the unit starts with obtaining a new or used insulated shipping container 102 that implements vents on each door and preferably has vents on each wall. In one example, there is an average of one vent per ten feet. An electrical panel, such as a 200 amp, 240 volt panel, can be coupled to one of the walls of container 102 for power. A Heating, Ventilation and Air Conditioning (HVAC) or other climate control unit and main fan can also be coupled to one of the walls of container 102. Intermittent fans can be installed every ten to twenty feet to allow for proper air circulation.

Figure 1B:
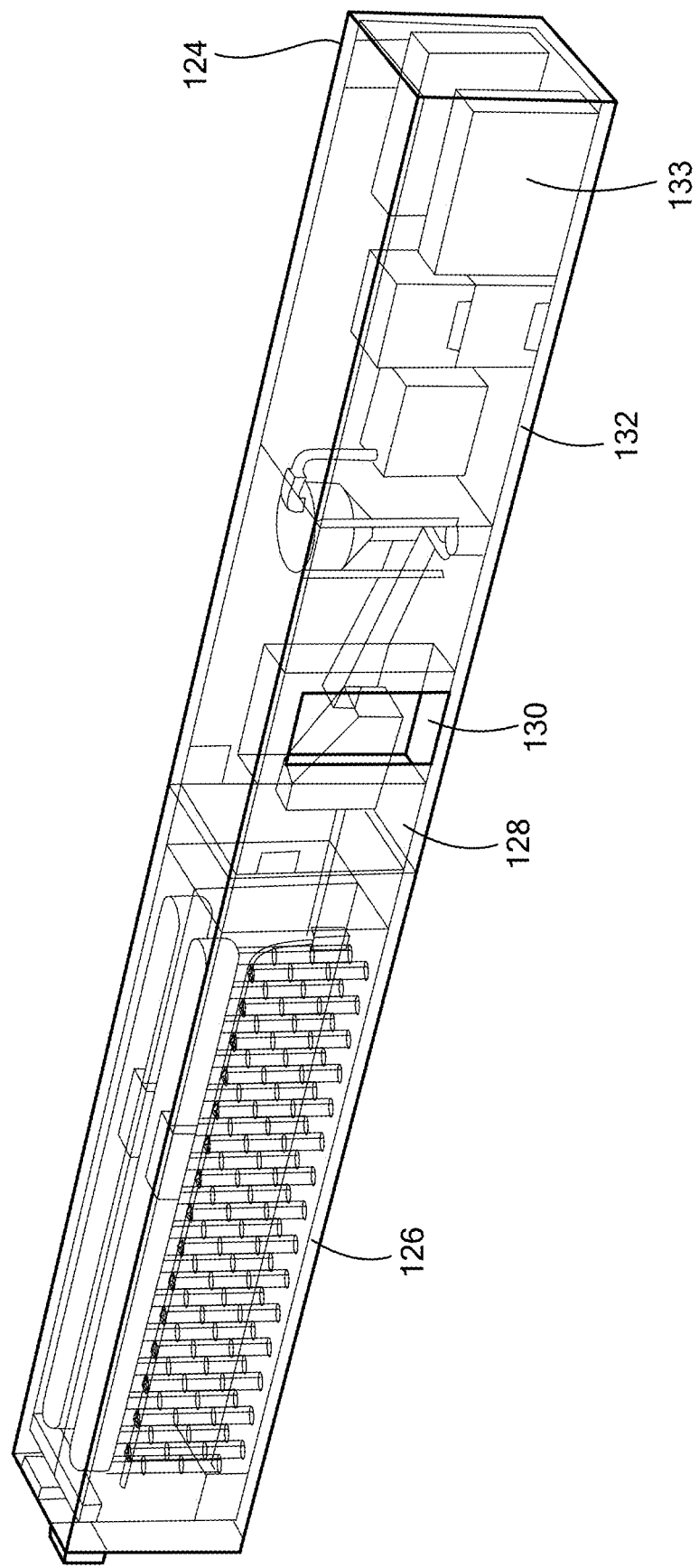
FIG. 1B shows a perspective sectional view of an illustrative growing container according to an embodiment of the disclosure.

FIG. 1B shows a perspective sectional view of an illustrative growing container according to an embodiment of the disclosure. The illustrative growing container of FIG. 1B may facilitate proper processing and preparation of substrate or growth medium. The illustrative growing container of FIG. 1B may also facilitate proper growing conditions (e.g., by eliminating or reducing environmental variables).

Different rooms (e.g., different shipping containers or divisions of shipping containers) may distinctly segment different stages of a production process (e.g., a fungi production process may be segmented into a substrate preparation area, a planting preparation area, a growing area, etc.). Growing containers may include several different container architectures—the straight layout of FIG. 1B is an embodiment. The growing container in FIG. 1B may use two containers placed end to end. One container (e.g., container 126) may consist primarily of one or more grow rooms (e.g., for fungi) and the other (e.g., container 124) may consist primarily of one or more subsystems to prepare growth medium (or substrate).

In some embodiments, these two containers could be completely separate, allowing a single prep shipping container to service multiple grow room shipping containers. In some embodiments, there may be one or more shared components between a grow shipping container and prep shipping container.

Room 132 of FIG. 1B may be for the storage of water and growth medium raw material (e.g., straw) Room 132 may also provide space for the chopping and loading of the growth medium or substrate into a tank. Room 132 may be segmented from the rest of the growing container in order to isolate the messy nature of the work. Room 132 may contain raw materials 133.

Room 128 may be a prep room. Room 128 may contain pasteurization, bagging and/or inoculation equipment. A majority of the physical labor may occur in room 128, which may be where the substrate is prepared for the grow rooms of container 126. There may be an "airlock" 130 from this room to the outside, allowing entry in a moderately sterile manner.

The one or more rooms of container 126 may be grow rooms for the growth of fungi. Each room may be independently environmentally controlled for both humidity and temperature. Fungi grow bags from a prep room may be arranged on "grow trees" that hang from automatic carousels. An exemplary grow tree is illustrated in FIGS. 19A and 19B. Carousels may facilitate access to a crop from a single operating point.

The primary functional element of the grow room is the environmental control. Each grow container may contain a plurality of grow rooms (e.g., two). The rooms can be long and skinny, and the carousel may be a long oval down the length of the room. Each room can have independent environmental control.

A single controller can be used for both rooms or multiple controllers may be used. A controller monitors the temperature, humidity and $CO_2$ in one or more grow rooms. Each of these measurements may control an independent "actuator" of some kind:

1. The temperature may control the AC units—there may be a mini split AC unit in each grow room.
2. The humidity may control the misting system—there may be an independent mister in each grow room.
3. The $CO_2$ sensor may control the ventilation fan, which may also be independent for each room, In addition, the grow lights may turn on and off at different times in the grow cycle. This could be controlled or manual.

FIG. 1C shows a sectional view of an illustrative growing container according to an embodiment of the disclosure. As illustrated in FIG. 1C, containers 134A and 134B may be for water and/or waste storage which may supply water to and/or receive waste from pasteurization tank 136. Misting pump 140 may supply one or more misting lines 142 to provide water to a fungi group and/or to add humidity to a growing environment. Air conditioner 144 may provide climate control to an environment.

FIG. 1D shows a sectional view of an illustrative growing container according to an embodiment of the disclosure. As illustrated in FIG. 1D, water heater 146 may provide temperature controlled water for pasteurization, which may be supplied by pump 148 to a pasteurization tank. Conveyor control unit 150 may facilitate movement of grow trees under one or more misting lines 142.

FIG. 1E shows a sectional view of an illustrative growing container according to an embodiment of the disclosure. As illustrated in FIG. 1E, a growing container may contain one or more work lights (e.g., work lights 156, 158, 164 and 166). A growing container may also contain one or more ventilators (e.g., ventilators 160, 162, 168, and 182). A preparation room may contain an agitator motor 174 (e.g., an auger motor for an auger of a pasteurization tank), heater and controller elements 176, a substrate conveyor 178, and a bagger 180. Grow rooms may contain conveyors 170 and 184 for moving one or more grow trees throughout a grow room. One or more light strips (e.g., LED strips 186A and 186B) may be arranged around a grow room. A grow room may contain air conditioners 172 and 188 to facilitate temperature control within a grow room.

FIG. 1F shows a sectional view of an illustrative growing container according to an embodiment of the disclosure. As illustrated in FIG. 1F, a bagger 180 may contain inoculator 190 for injecting a liquid culture into a substrate (e.g., injecting a liquid culture into a grow bag at one or more locations). Wall switch 192 may control a substrate conveyor, a pasteurization agitator (e.g., an auger) or other components. Control box 194 may contain relays to one or more additional components (e.g., A/C units, carousels, pumps, lights, etc.).

Figure 1G:
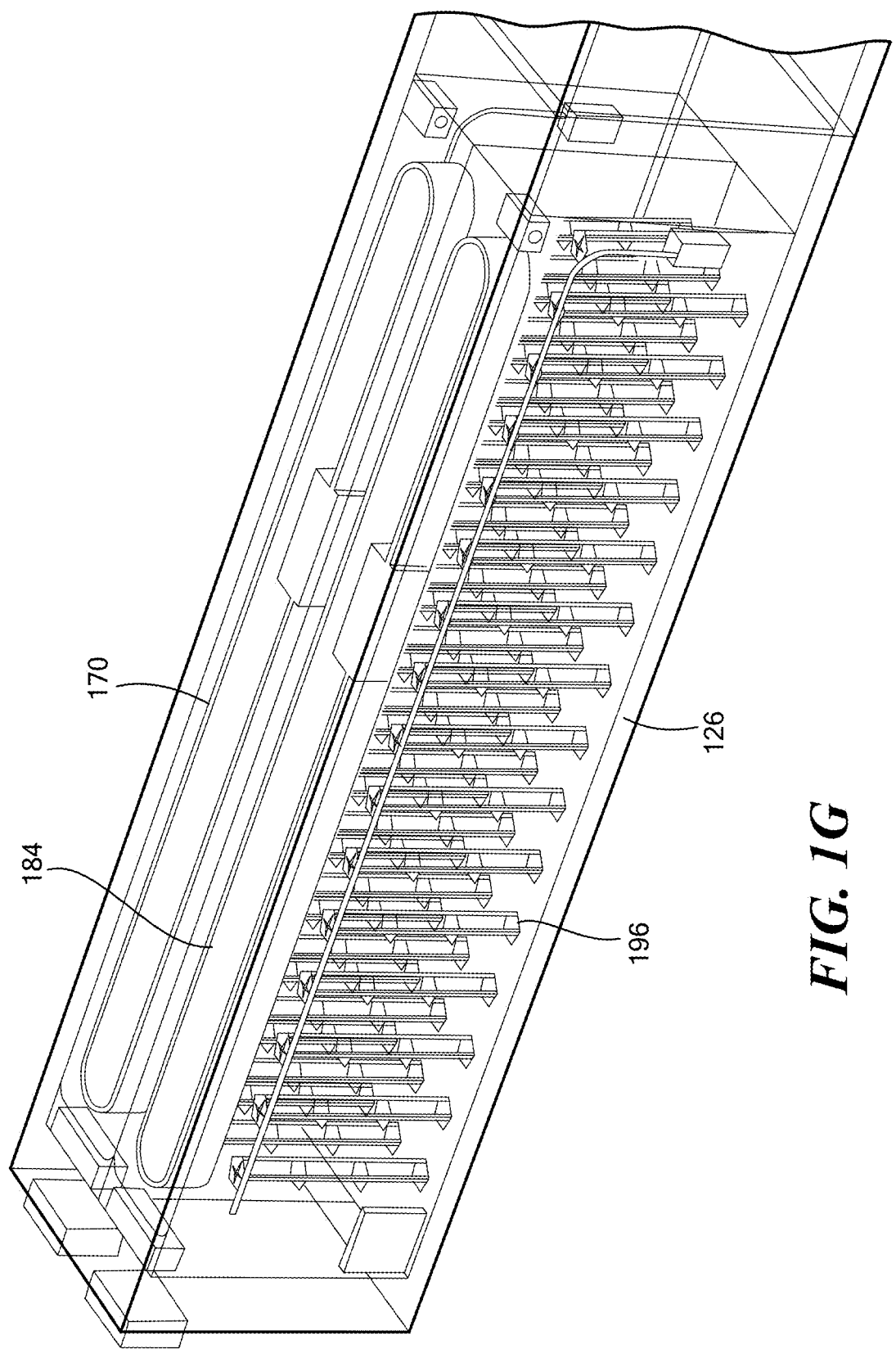
FIG. 1G shows a perspective sectional view of a growing area of an illustrative growing container according to an embodiment of the disclosure.

FIG. 1G shows a perspective sectional view of a growing room of an illustrative growing container 126 according to an embodiment of the disclosure. Properly prepared substrate may be packaged into sealed bags in a prep room and loaded onto one or more grow trees 196 suspended from carousels 170 and 184. A grow room may then be darkened. Temperature and humidity may be maintained at a particular set point as the fungi spawn propagate (e.g., into mycelium) and takes over the substrate.

After a period of time (e.g., about three weeks), conditions inside one or more grow rooms may be rapidly changed (e.g., the temperature may be dropped, the humidity increased, and the lights turned on). At this time an operator may also punch holes in the grow bags at the locations where fungi will sprout from.

Several days later, the fungi may sprout and may be harvested. The carousels may allow the fungi to be taken out (e.g., from a single operator position) and carried out through a prep room airlock. For example, strips dividing rooms may be tied aside for this operation.

Figure 1H:
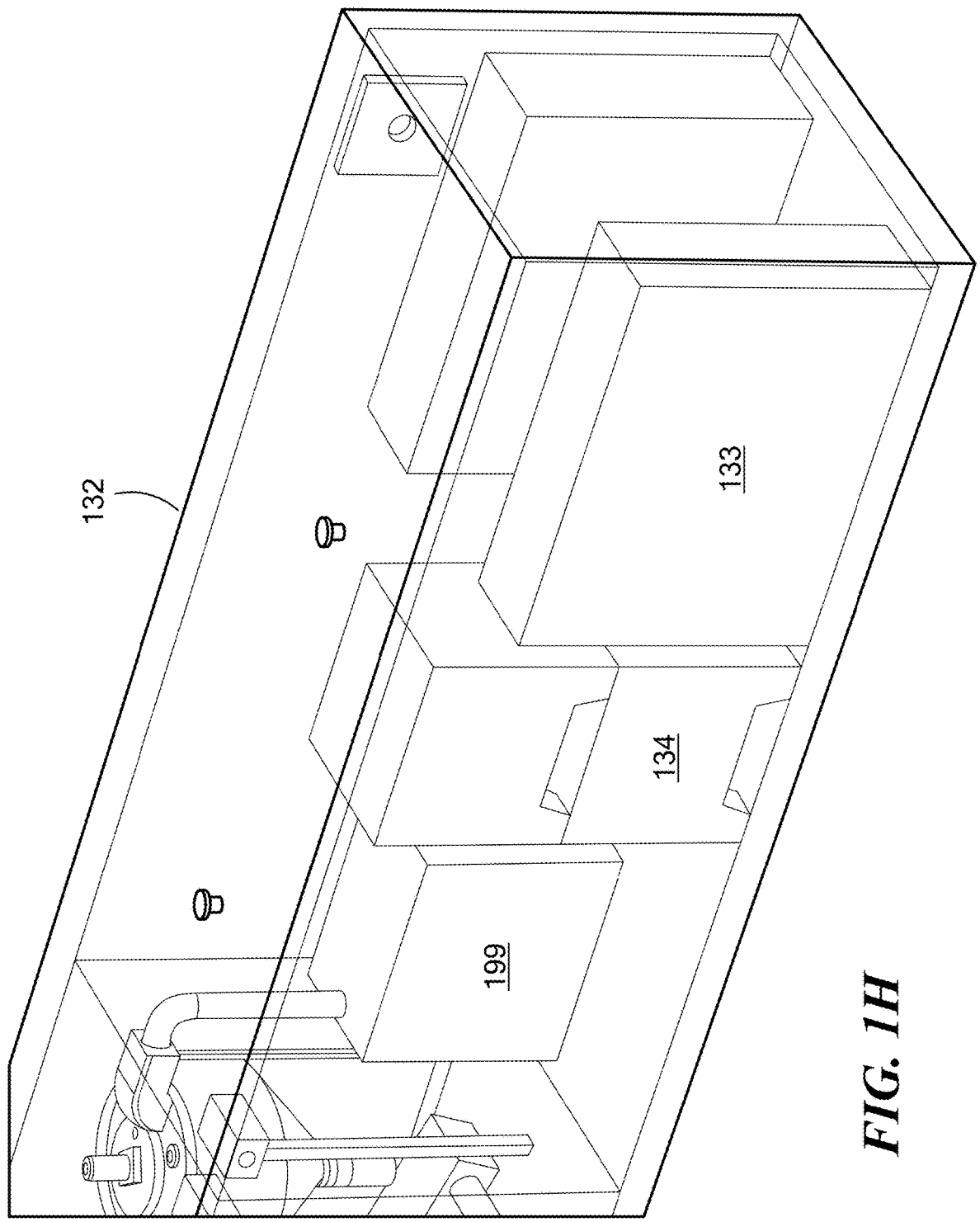
FIG. 1H shows a perspective sectional view of a substrate storage area an illustrative growing container according to an embodiment of the disclosure.

FIG. 1H shows a perspective sectional view of substrate storage area 132 of an illustrative growing container according to an embodiment of the disclosure. Substrate storage room 132 may serve several functions. Substrate storage room 132 may store substrate raw materials such as substrate material 133 and containers 134 (e.g., straw and water). Substrate storage area 132 may also provide an isolated area for the preparation of substrate (e.g., loading and chopping) which may reduce mess and contamination to other areas of a growing container. One end of substrate storage room 132 may open away from the rest of a growing container to the outside environment (e.g., through regular double doors on a freight container). Substrate storage area 132 may be lit by two work light fixtures on the ceiling with a light switch placed by the door, and is ventilated by a fan and filter system. Substrate storage area 132 may be completely sealed from the rest of the unit (e.g., to get into a prep room it may be necessary to go outside and back through the airlock on the side of the prep room). Substrate (e.g., straw) may be stored in the side of the room closest to the double doors. It may simply be stacked in bale form.

A substrate chopper 199 may be placed on the growing container side of substrate storage area 132. One or more different types of chopping or substrate preparation systems may be used to prepare raw substrate materials (e.g., straw). For example, a chopper/blower combination may be used to blow the chopped straw directly into the pasteurization tank through the scoop on the tank and the chopper hose. Substrate storage area 132 may be vented (or one or more doors may be open) when running a chopper inside. In some embodiments, if there is a pre-chopped substrate available then a chopper can be replaced with a step ladder and a scoop on a pasteurization tank can be widened to allow a user to place the chopped substrate directly in the tank.

Water can be stored in one or more stacked containers 134 (e.g., IBC 275 gallon totes) inside substrate storage area 132. These containers can be plumbed by their drain lines to a system water supply pump in a prep room. In some embodiments multiple containers may be used for water storage and drain water may be sent from the pasteurization tank to an outside drain (e.g., through either the wall of the growing container or an airlock door).

Figure 1I:
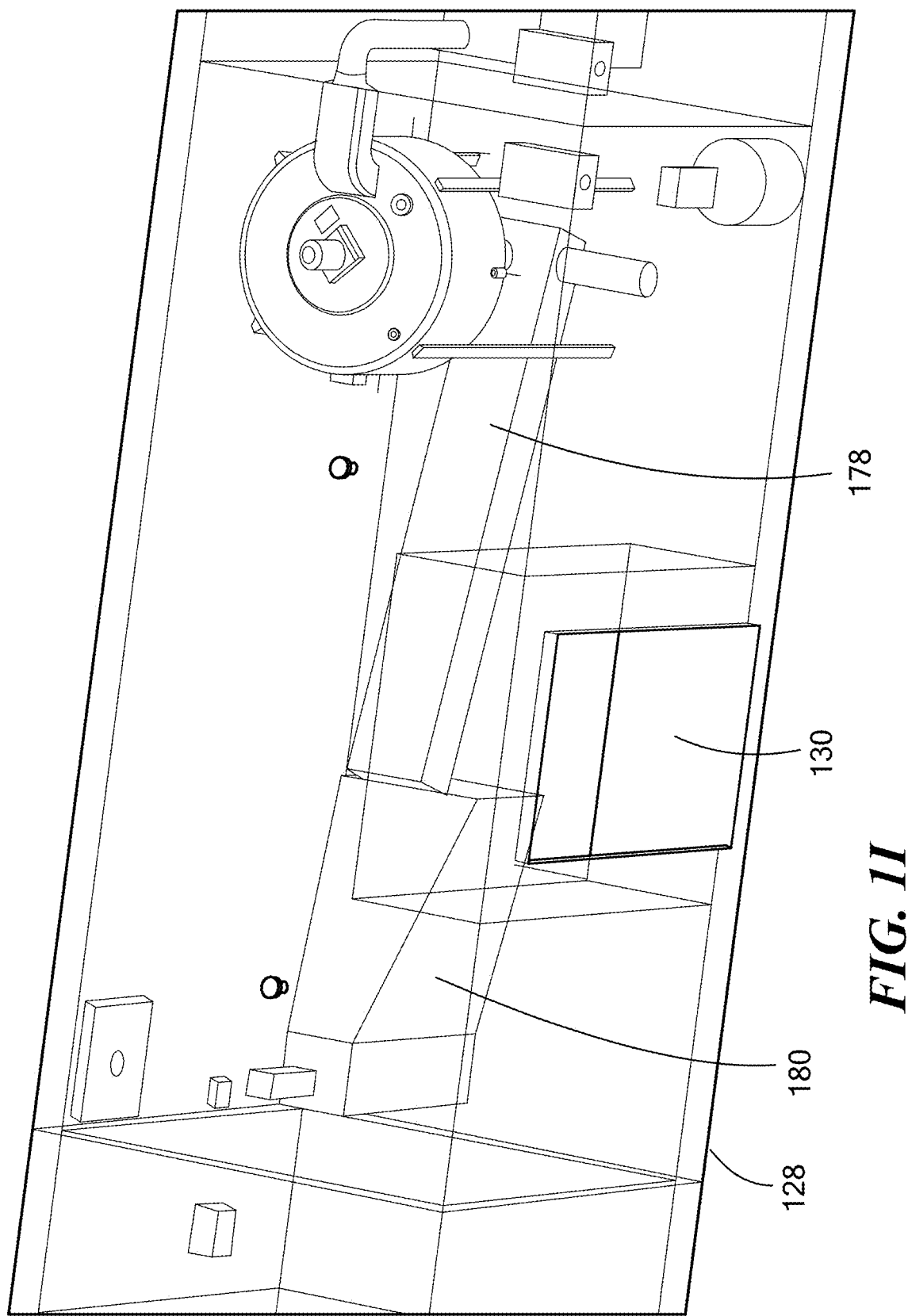
FIG. 1I shows a perspective sectional view of a growth preparation area of an illustrative growing container according to an embodiment of the disclosure.

FIG. 1I shows a perspective sectional view of a growth preparation area room 128 of an illustrative growing container according to an embodiment of the disclosure. Prep room 128 may contains one or more components used to turn chopped substrate into fungi-ready substrate bags, packed with grain spawn. Prep room 128 may also have the support systems for other rooms, including ventilation and work lighting. There can be an airlock door 130 to the outside, and a foot wash can be placed in this airlock if desired.

According to an embodiment, the steps to use prep room 128 may include:

1. Chopped substrate is injected into the pasteurization tank from the substrate storage area 132 (e.g., by hand or using a chopper/blower).
2. Hot water is injected into the pasteurization tank (e.g., from a propane hot water heater), covering the chopped substrate. As the water height rises, a controller kicks on (e.g., a controller from Watlow Electric Manufacturing Company) and the internal tank heating elements keep the water at a constant preset temperature.
3. An auger motor is turned backwards intermittently during the pasteurization time to ensure that the entire tank is kept at a relatively even temperature.
4. When finished, the drain valve at the bottom of the tank is opened and the auger is turned constantly backwards to keep the drain clear of substrate.
5. As the water finishes draining, a main valve on the pasteurization tank is opened, and the auger is switched to the forward direction (forcing the substrate out onto the conveyor).
6. The conveyor is turned on, as is the bagging machine. The bagging machine fills the bags with chopped, moist substrate.
7. The inoculation subsystem may sit on top of the bagger, passively spreading grain spawn into the substrate as it is bagged.
8. After a bag is filled, it is sealed with a seam sealer and placed on the grow room carousel.

Figure 2:
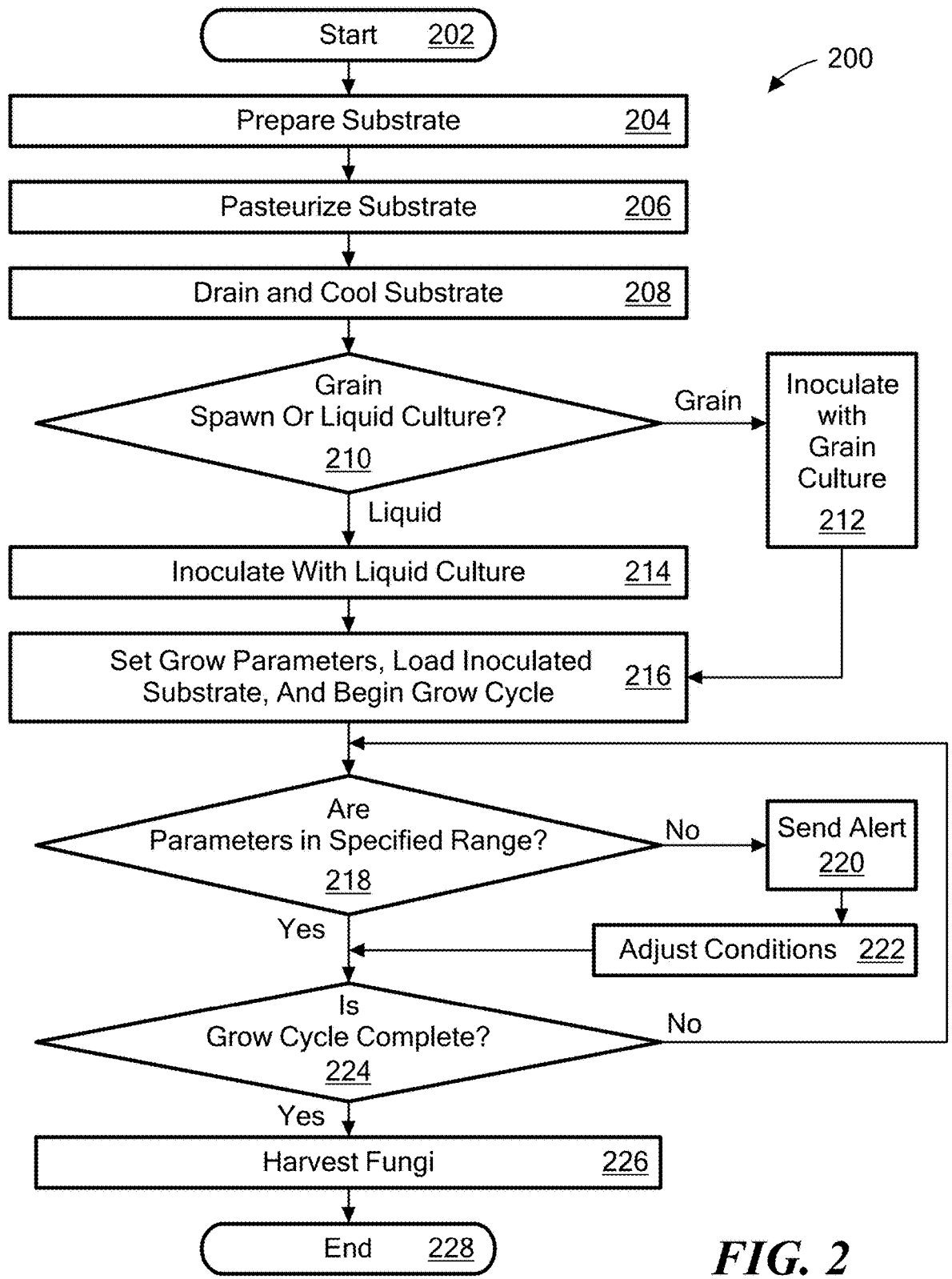
FIG. 2 shows an illustrative flow diagram of a process for growing fungi according to an embodiment of the disclosure.

FIG. 2 shows an illustrative flow diagram of a process for growing fungi according to an embodiment of the disclosure. At block 202, the method 200 for fungi growing may begin.

At block 204, substrate preparation may begin. Substrate may include one or more mediums capable of accepting fungi spore and supporting growth of fungi (e.g., straw, wood chips, sawdust, cardboard, coffee grounds, and other cellulose-based substrates.) Substrate preparation may include chopping, cutting, blowing, and/or grinding substrate into a growth medium.

At block 206, substrate may be pasteurized. Pasteurization may include, for example, soaking a substrate in a heated liquid (e.g., water heated between 160 and 180 degrees, steam heat, dry heat, soaking in a solution of peroxide, etc.). Pasteurization may reduce an amount of harmful bacteria in a substrate and improve fungi production.

At block 208, substrate may be drained and cooled. Draining and cooling may use an inclined passage, an auger, or another method of conveying, draining, and/or cooling substrate.

At block 210, a type of fungi culture may be selected. Selection may depend on a type of fungi cultivation desired. For example, a grain spawn may be selected or a liquid spawn may be selected. If a grain spawn is selected the method may continue at block 212. If a liquid spawn is selected the method may continue at block 214. At block 212, a substrate may be inoculated with a grain culture. At block 214, a substrate may be inoculated with a liquid culture.

At block 216, one or more growth preparation steps may be taken. For example, one or more growth parameters may be set. Inoculated substrate may be loaded into one or more hanging growing modules. A grow cycle may begin.

At block 218, one or more growing conditions may be monitored. It may be determined whether one or more growing parameters are in a specified range. If one or more parameters are not in a specified range, the method may continue at block 220. If grow parameters are in a specified range, the method may continue at block 224.

At block 220, an alert may be sent to a user. Alerts may include one or more of an email, a text message, a web posting, a log file, a phone message, or other forms of electronic communication. An alert may indicate a triggering event (e.g., a parameter is outside of a specified range—such as a temperature too hot or a $CO_2$ level too low). An alert may provide one or more suggested remedies or may provide access to a control for adjusting environmental conditions (e.g., a link to a user interface for adjusting one or more of temperature, humidity, $CO_2$, etc.).

At block 222, conditions may be adjusted. For example, an amount of $CO_2$, an amount of water, a temperature, an amount of light, or another environmental condition may be adjusted.

At block 224, it may be determined whether a grow cycle is complete. The determination may be performed based on one or more factors such as, for example, an expiration of a time period, a measurement of fungi growth, an optical measurement, and/or a visual inspection. If a grow cycle is not complete the method may return to block 218. If a grow cycle is complete the method may continue at block 226.

At block 226, fungi may be harvested. At block 228, the method 200 may end.

Figure 3:
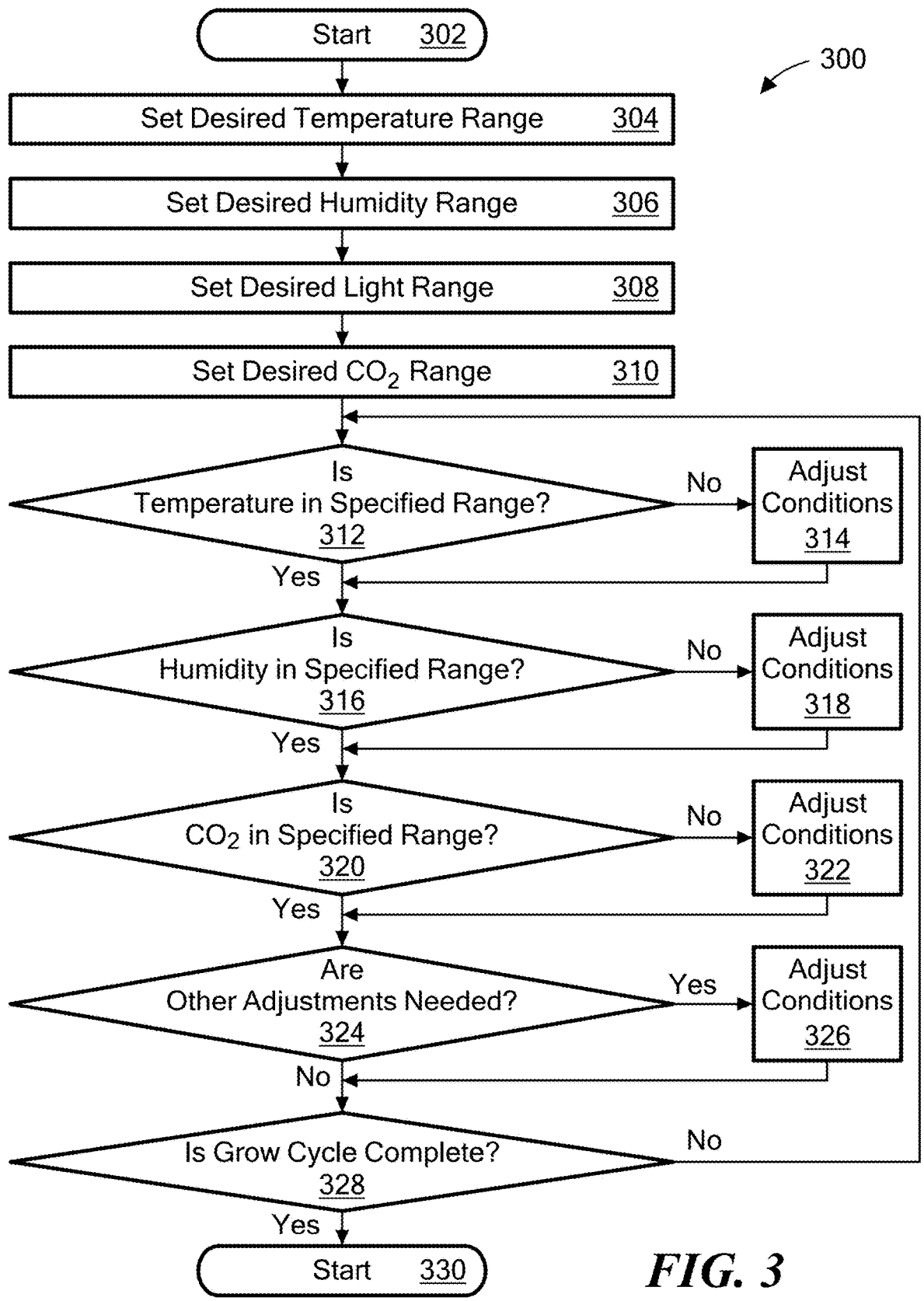
FIG. 3 shows an illustrative flow diagram of monitoring a process for growing fungi according to an embodiment of the disclosure.

FIG. 3 shows an illustrative flow diagram of monitoring a process for growing fungi according to an embodiment of the disclosure. At block 302, the method 300 for monitoring growing fungi may begin.

At block 304 a desired temperature range may be set for one or more areas of a growing container. According to some embodiments, different temperature ranges may be set for different areas (e.g., growing rooms) of a growing container.

At block 306 a desired humidity range may be set for one or more areas of a growing container. According to some embodiments, different humidity ranges may be set for different areas (e.g., growing rooms) of a growing container.

At block 308 a range of acceptable levels of light may be set. According to some embodiments, no light may be permitted, only light within a specified wavelength may be permitted, or a low level of light may be permitted. For example, a blue LED lighting system may be used.

At block 310 a range of acceptable $CO_2$ levels may be set. $CO_2$ levels and/or other parameters may be set according to a type and or amount of fungi cultivated.

At blocks 312 through 324 the method may determine whether one or more parameters are within a specified range. Parameter levels may vary depending on a type of fungi cultivated. At block 312 if the temperature is not within a specified range the method may continue at block 314. At block 314, the temperature may be adjusted. If the temperature is within a specified range the method may continue at block 316.

At block 316 if humidity is not within a specified range the method may continue at block 318. At block 318, the humidity may be adjusted. If humidity is within a specified range the method may continue at block 320.

At block 320 if $CO_2$ is not within a specified range the method may continue at block 320. At block 320, the $CO_2$ may be adjusted. If $CO_2$ is within a specified range the method may continue at block 324.

At block 324 if other parameters (e.g., fungi growth amount, light level, etc.) are not within a specified range the method may continue at block 326. At block 326, the parameters may be adjusted. If parameters are within a specified range the method may continue at block 328. At block 328, it may be determined whether a grow cycle is complete. If a grow cycle is not complete the method may return to block 312. If a grow cycle is complete the method may end at block 330.

Figure 4A:
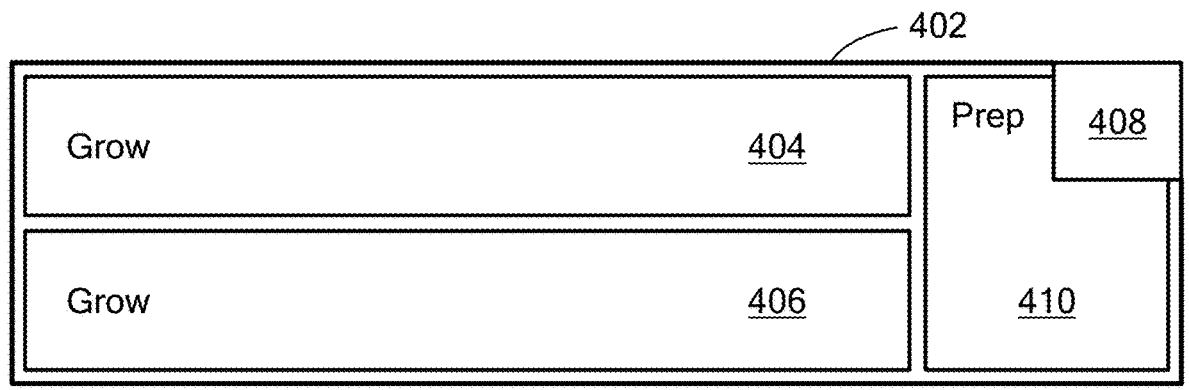
FIG. 4A depicts a layout of areas in a growing container according to an embodiment of the disclosure.

FIG. 4A depicts a layout of areas in a growing container according to an embodiment of the disclosure. Grow container 402 may contain adjoining grow areas 404 and 406, preparation area 410 and airlock 408. Grow areas may hold fungi in hanging growing modules. Hanging growing modules may provide vertical racks, shelves, or platforms for supporting one or more containers or bags of pasteurized and inoculated substrate (e.g., grow bags). As described in further detail below with reference to FIG. 19A, hanging growing modules may provide a connection point for attaching to a ceiling or an overhead conveyor and may provide a dense growing configuration. Preparation room 410 may provide space and/or apparatus for loading inoculated substrate into one or more bags or other containers and onto hanging growing modules. Airlock 408 may provide an entrance to grow container 402 designed to reduce contamination to grow areas. An arrangement of growing areas may depend on crop yield, fungi to be grown, reducing a risk of contamination, providing for improved operator access to fungi, and other factors.

Figure 4B:
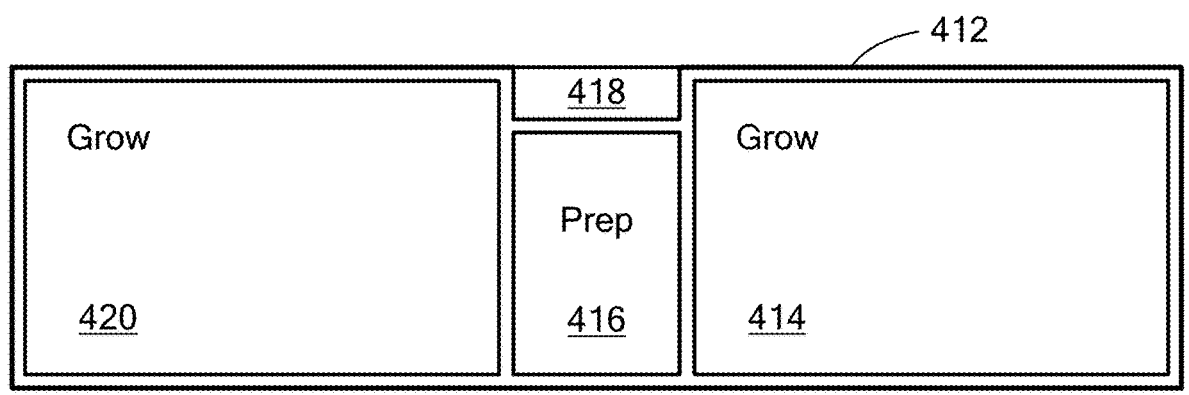
FIG. 4B depicts an alternative layout of areas in a growing container according to an embodiment of the disclosure.

FIG. 4B depicts an alternative layout of areas in a growing container according to an embodiment of the disclosure. Grow container 412 may contain grow areas 414 and 420 separated by preparation area 416 and airlock 418.

Figure 4C:
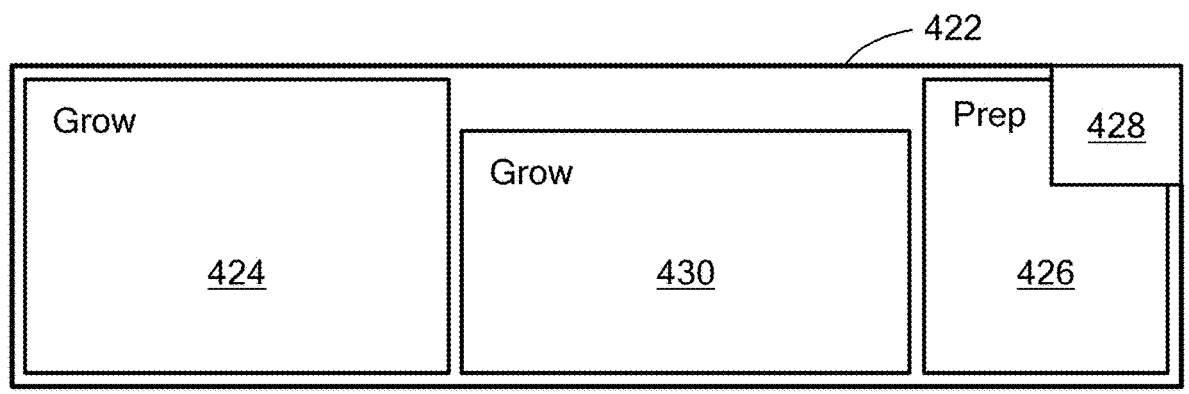
FIG. 4C depicts another alternative layout of area in a growing container according to an embodiment of the disclosure.

FIG. 4C depicts another alternative layout of area in a growing container according to an embodiment of the disclosure. Grow container 422 may contain grow areas 424 and 430 arranged end to end. Grow container 422 may also contain preparation area 426 and airlock 428.

Substrate Preparation and Pasteurization

Substrate may include one or more mediums capable of accepting fungi spore and supporting growth of fungi (e.g., straw, wood chips, sawdust, cardboard, coffee grounds, and other cellulose-based substrates). Preparation of substrate may include chopping, slicing, grating, shredding or otherwise preparing the growth medium to support growth of fungi. Pasteurization may include, for example, soaking a substrate in a heated liquid (e.g., water heated between 160 and 180 degrees, steam heat, dry heat, soaking in a solution of peroxide, etc.). Pasteurization may reduce an amount of harmful bacteria in a substrate and improve fungi production.

Figure 5:
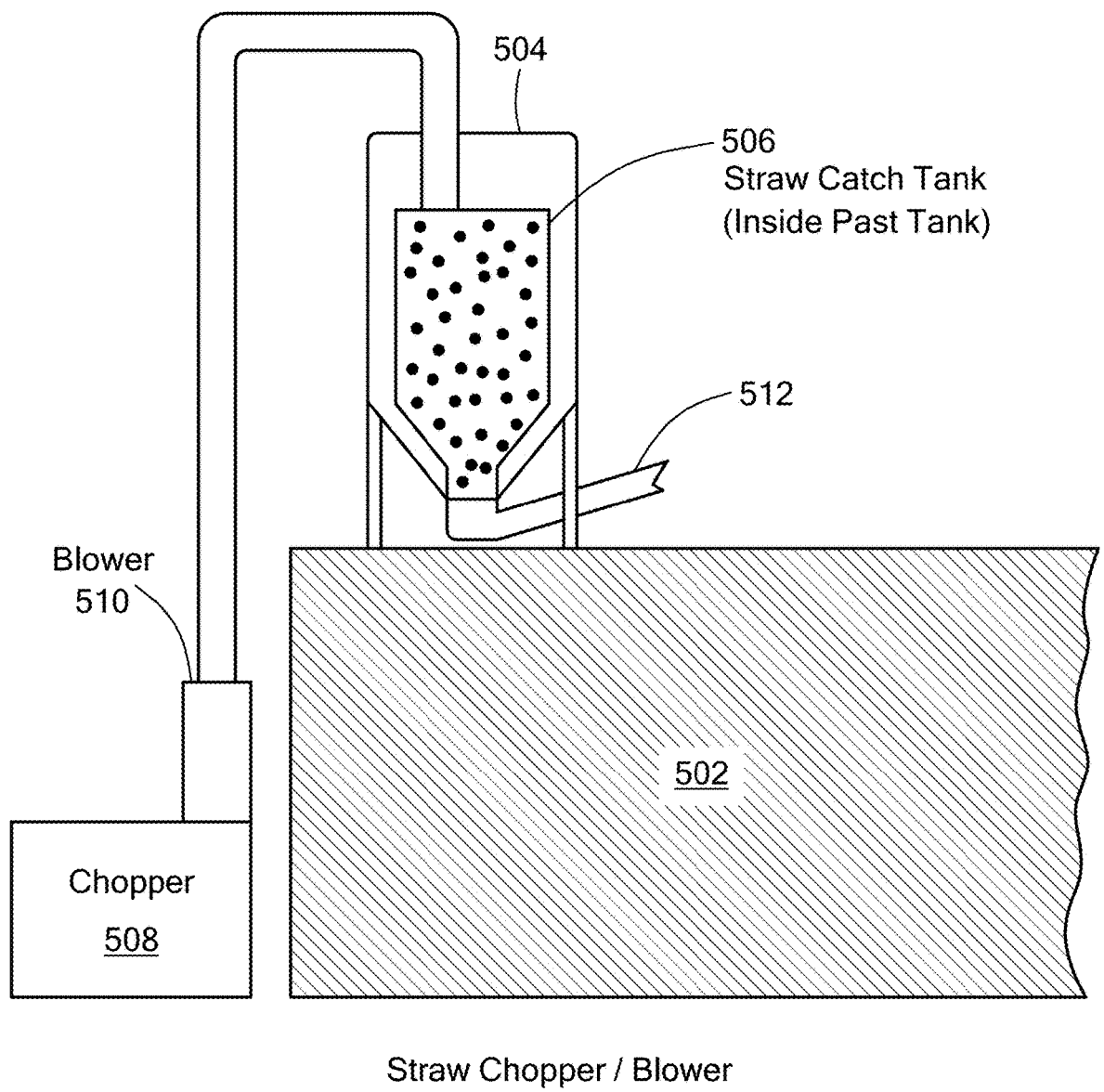
FIG. 5 depicts a substrate preparation system according to an embodiment of the disclosure.

FIG. 5 depicts a substrate preparation system according to an embodiment of the disclosure. Pasteurization tank 504 may be on top of grow container 502, adjoining grow container 502, or in close proximity to grow container 502. Pasteurization tank 504 may contain an outer tank and an inner tank 506. Inner tank 506 may receive substrate (e.g., chopped straw) from a conduit. The conduit may be connected to blower 510 or another apparatus for substrate conveyance. Blower 510 may move chopped, cut, or shredded substrate from chopper 508 of substrate tank 504 to inner tank 506. Chopped substrate in inner tank 506 may be pasteurized. After pasteurization, chopped and pasteurized substrate may be received by draining and cooling conduit 512.

According to some embodiments, the substrate starts as bales of uncut straw. Chopper 508 may first cut a straw bale into small pieces (e.g., with a Common Off The Shelf (COTS) straw chopper). A blower may send the cut straw upwards to the roof, and into the pasteurization tank. The pasteurization tank may have a straw catch area to allow for the blown straw to settle and prevent clogging.

FIG. 6A illustrates a substrate pasteurization system according to an embodiment of the disclosure. Pasteurized substrate may include one or more mediums capable of accepting fungi spore and supporting growth of fungi (e.g., straw, wood chips, sawdust, cardboard, coffee grounds, and other cellulose-based substrates.) Pasteurization tank 602 may contain outer tank 604, inner tank 605, water mixer 606, and water input 608. Pasteurization tank 602 may be operatively connected to substrate input (e.g., hay blower tube) 612, stir and output auger 610, master output valve 620, drain and cool auger tube 618, and water drain 616. Inner tank 605 may contain one or more perforations 614 allowing a pasteurization solution to circulate between inner tank 605 and outer tank 604.

According to some embodiments, substrate (e.g., straw) may be blown into inner tank 605, which may contain a stir and output auger 610 to either stir the substrate or force it through a bottom orifice 622. The bottom orifice 622 may be of varying sizes (e.g., approximately 2" wide, 4" wide, etc.) and may be controlled by master output valve 620 (e.g., a ball valve). Inner tank 605 may be perforated to allow water, but not substrate, to flow between inner tank 605 and outer tank 605. The sizing and spacing of these perforations may facilitate pasteurization. According to some embodiments, outer tank 604 may encapsulate inner tank 605 in such a way that a water level can rise above the top of inner tank 605. This may allow substrate to be forcibly dunked into water. According to some embodiments, a heater and water drain may be in outer tank 604 but not inner tank 605. Water mixer 606 (e.g., a circulation pump) may circulate water from inner tank 605 to outer tank 604 (keeping a pressure low on the inside tank to improve water flow). In some embodiments, outer tank 604 can be a modified COTS tank (it is possible that the inner tank 605 can be as well). Outer tank 604 may receive water from a water holding tank, and may drain to a water drain tank. When the substrate is finished, the water is first drained and then an auger (e.g., stir and output auger 610) in inner tank 605 may force wet substrate through the bottom orifice and into the cooling section (e.g., drain and cool auger tube 618).

Figure 6B:
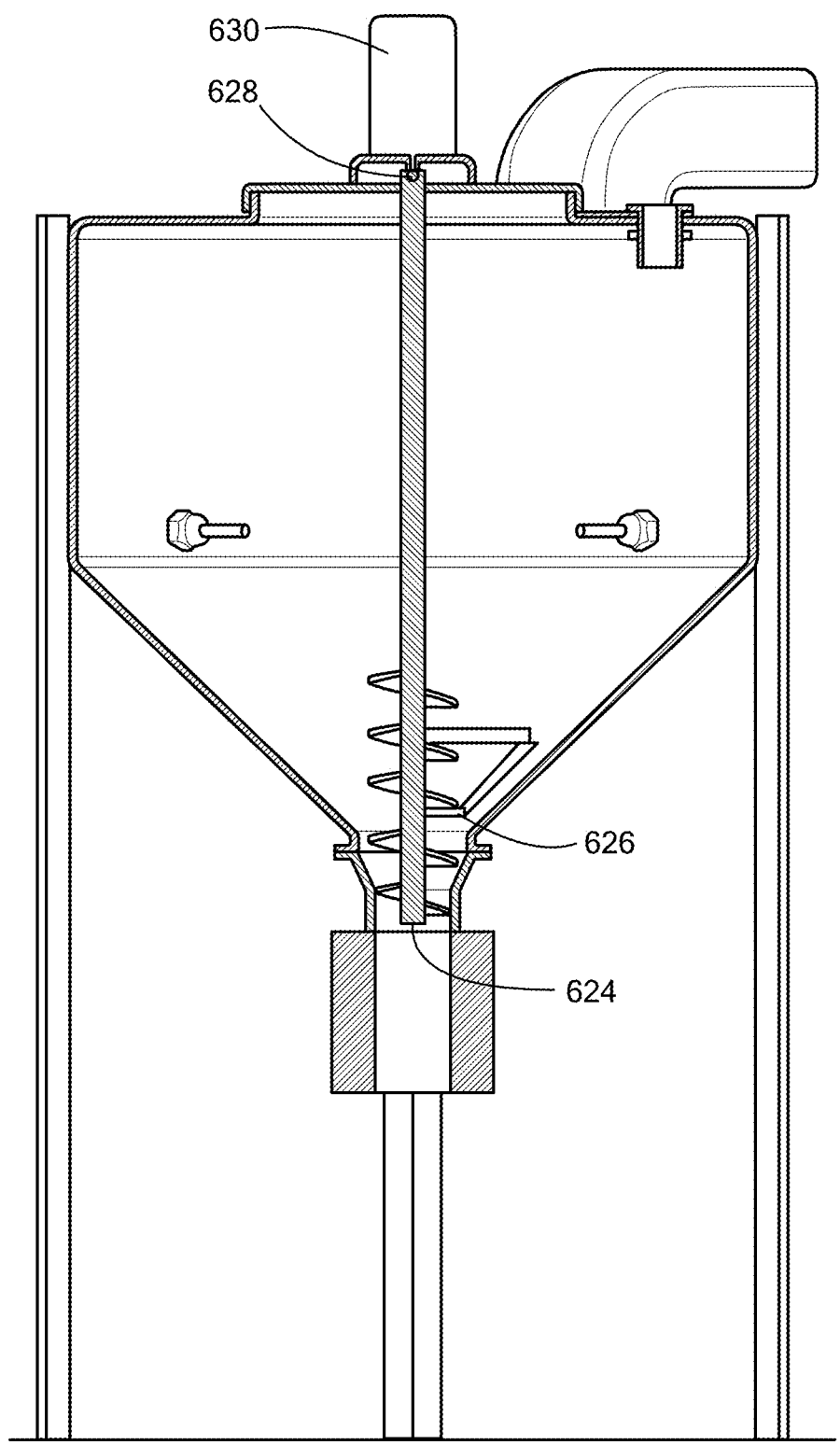
FIG. 6B illustrates a substrate pasteurization tank according to an embodiment of the disclosure.

FIG. 6B illustrates a substrate pasteurization tank according to an embodiment of the disclosure. As illustrated in FIG. 6B, agitator 624 may include blades 626. Agitator 624 may be an auger which may turn a first direction to stir substrate and an opposite direction to expel substrate from a pasteurization tank. As illustrated, agitator motor 630 may be mounted on top of a tank and agitator 624 may be suspended by connector 628 (e.g., a thrust bushing).

Figure 6C:
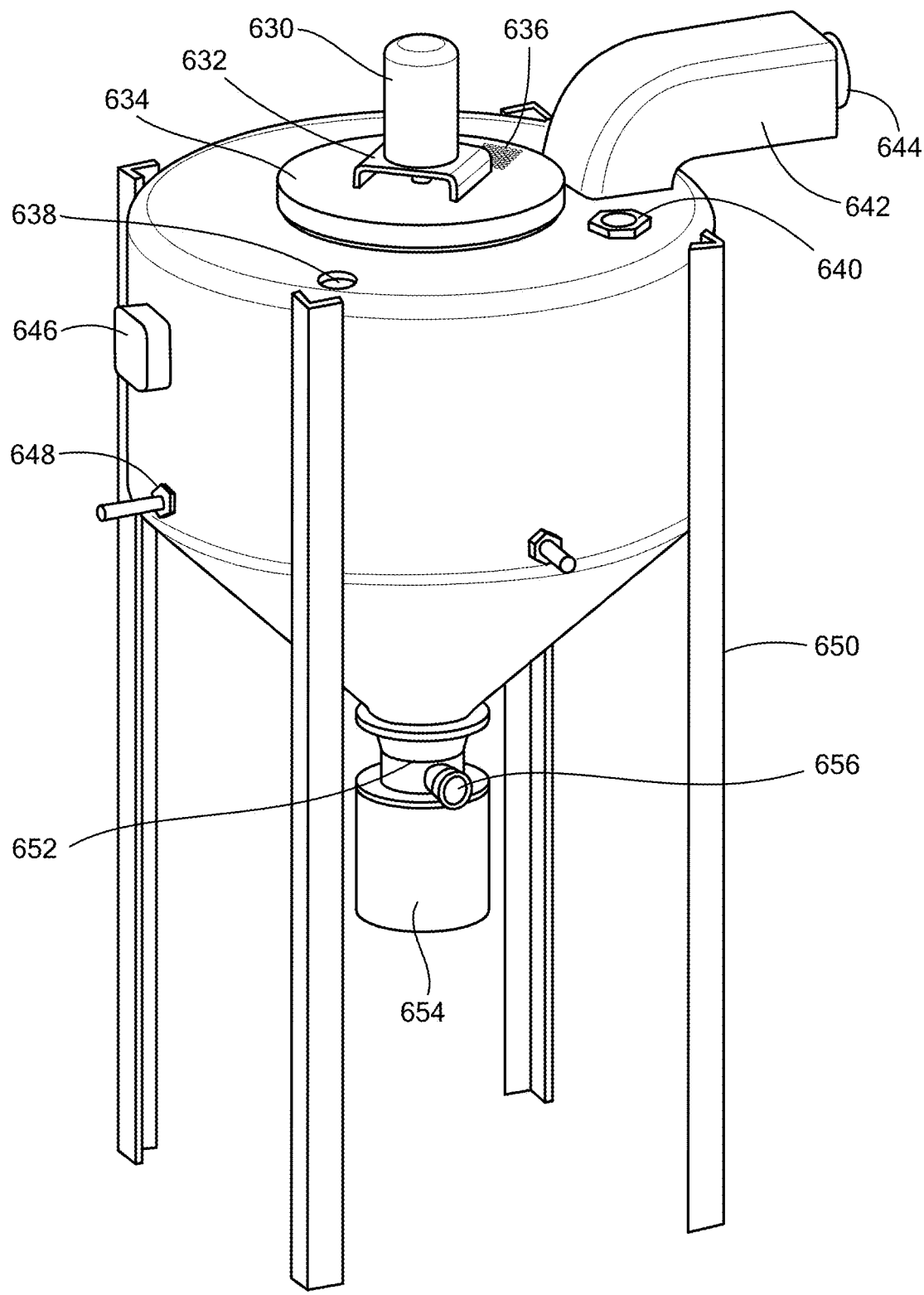
FIG. 6C illustrates a substrate pasteurization tank according to an embodiment of the disclosure.

FIG. 6C illustrates a substrate pasteurization tank according to an embodiment of the disclosure. As illustrated in FIG. 6C agitator motor 630 may be mounted on mount 632 to pasteurization tank lid 634. Pasteurization tank lid 634 may include vent 636 which may permit an escape of blower/loader air. A top of a pasteurization tank may include a water fill port 640 and a tank access port 638. Tank access port 638 may permit access to a pasteurization tank to insert a probe to check temperature levels, water levels, or for other measurements. Temperature controller 646 may be mounted on a side of tank, according to some embodiments. Heater 648 may be an immersion heater which may be inserted via a side port into a pasteurization tank. A pasteurization tank may be supported by legs 650. A pasteurization tank may drain via valve 652 which may have a master valve 654 and a drain port 656. Drain port 656 may allow for the draining of water while valve 652 keeps substrate from discharging. When water has drained (after pasteurization of substrate) valves 652 and 654 may be opened and an internal agitator or auger may be used to discharge pasteurized substrate to a conveyor.

Figure 6D:
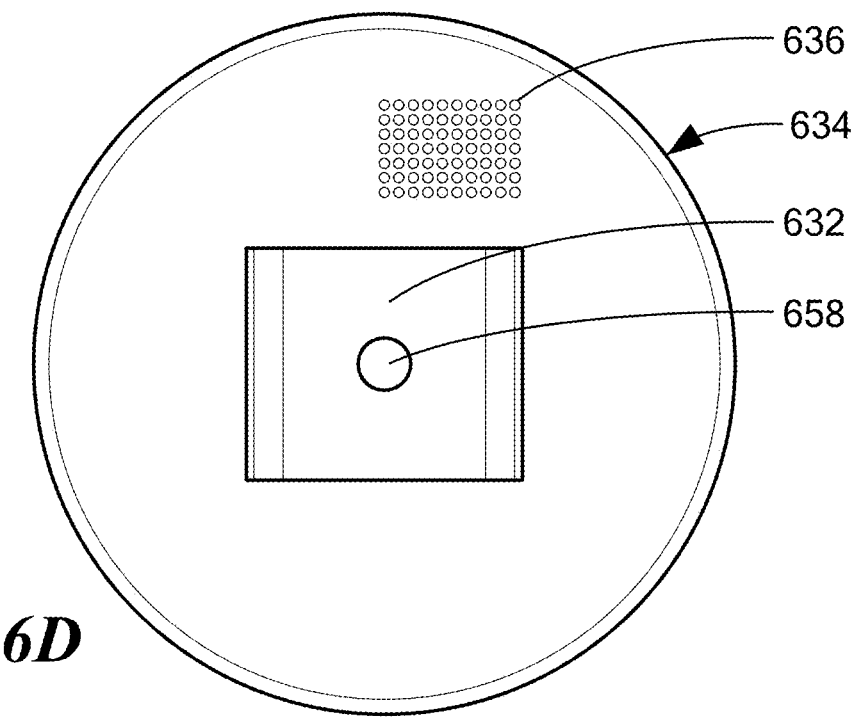
FIG. 6D illustrates a substrate pasteurization tank lid according to an embodiment of the disclosure.

FIG. 6D illustrates a substrate pasteurization tank lid according to an embodiment of the disclosure. As illustrated port 658 may provide access for an agitator shaft via mount 632 and tank lid 634. Vent 636 may be opened or closed (e.g., open during a blowing process and closed or partially closed during pasteurization). Vent 636 may be screened to allow for the escape of air but not the discharge of substrate.

Figure 6E:
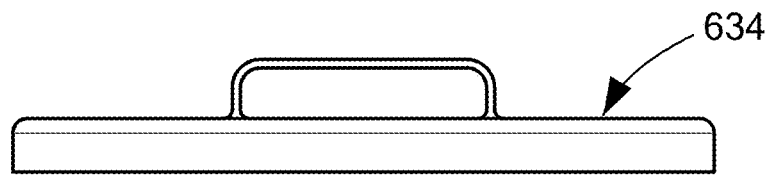
FIG. 6E illustrates a substrate pasteurization tank lid according to an embodiment of the disclosure.

FIG. 6E illustrates a substrate pasteurization tank lid according to an embodiment of the disclosure. Pasteurization tank lids may be different diameters in different embodiments.

Figure 6F:
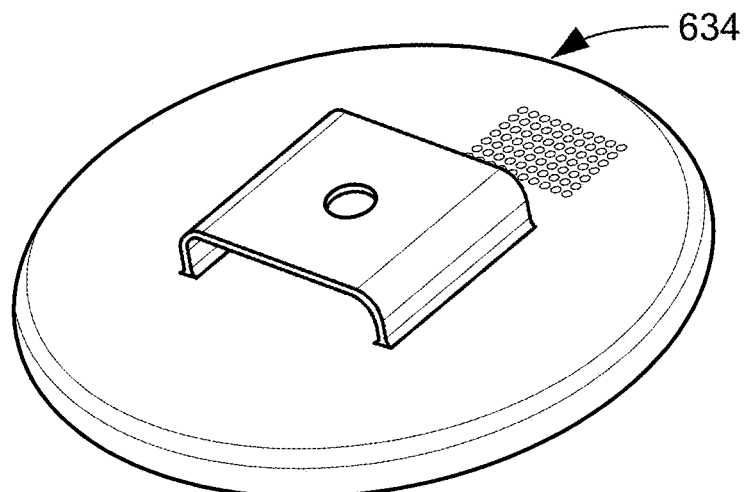
FIG. 6F illustrates a substrate pasteurization tank lid according to an embodiment of the disclosure.

FIG. 6F illustrates a substrate pasteurization tank lid according to an embodiment of the disclosure. Substrate pasteurization tank lid 634 may include vent 636. In some embodiments, a vent may be provided on a separate portion of a pasteurization tank and substrate pasteurization tank lid may not contain a vent.

Figure 6G:
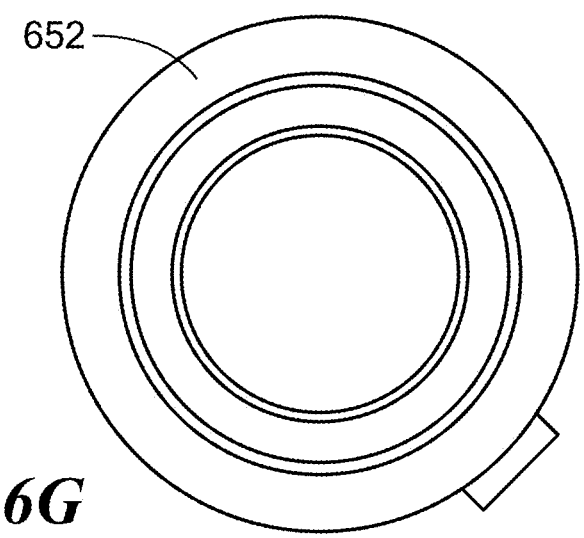
FIG. 6G illustrates a substrate pasteurization tank orifice adapter according to an embodiment of the disclosure.

FIG. 6G illustrates a substrate pasteurization tank orifice adapter according to an embodiment of the disclosure. Valve 652 may have an upper portion for fitting to a bottom of a pasteurization tank and a lower portion for discharging pasteurized substrate.

Figure 6H:
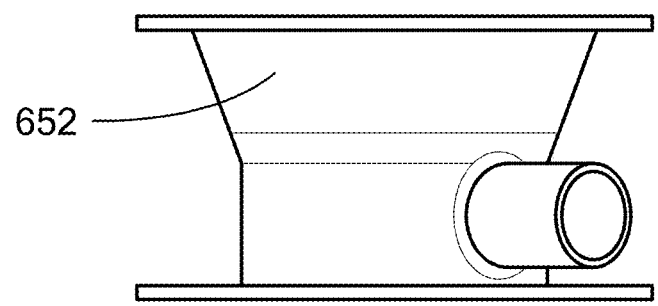
FIG. 6H illustrates a substrate pasteurization tank orifice adapter according to an embodiment of the disclosure.

FIG. 6H illustrates a substrate pasteurization tank orifice adapter according to an embodiment of the disclosure. Valve 652 may contain an inner valve or mechanism for allowing the draining of water while retaining all, substantially all, or a portion of the substrate.

Figure 6I:
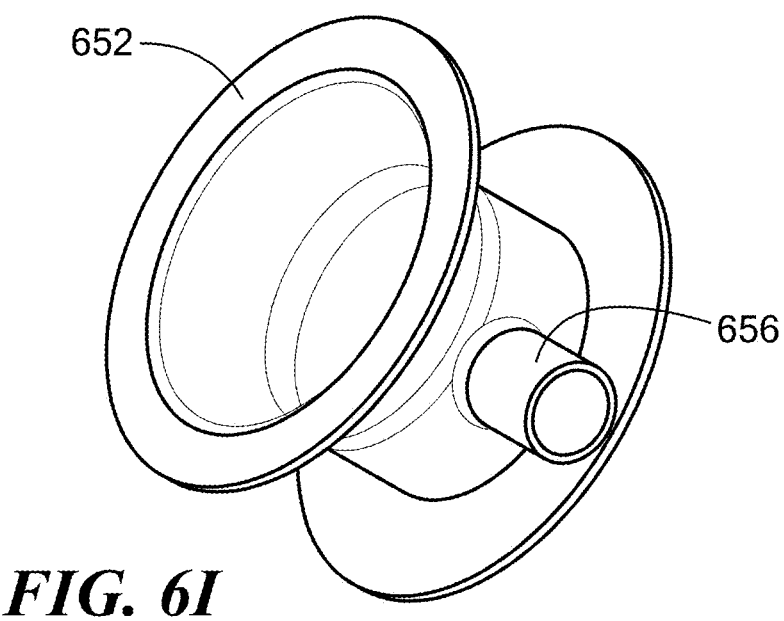
FIG. 6I illustrates a substrate pasteurization tank orifice adapter according to an embodiment of the disclosure.

FIG. 6I illustrates a substrate pasteurization tank orifice adapter according to an embodiment of the disclosure. As illustrated in FIG. 6I, drain port 656 may allow draining of water or other solutions from pasteurized substrate.

Figure 6J:
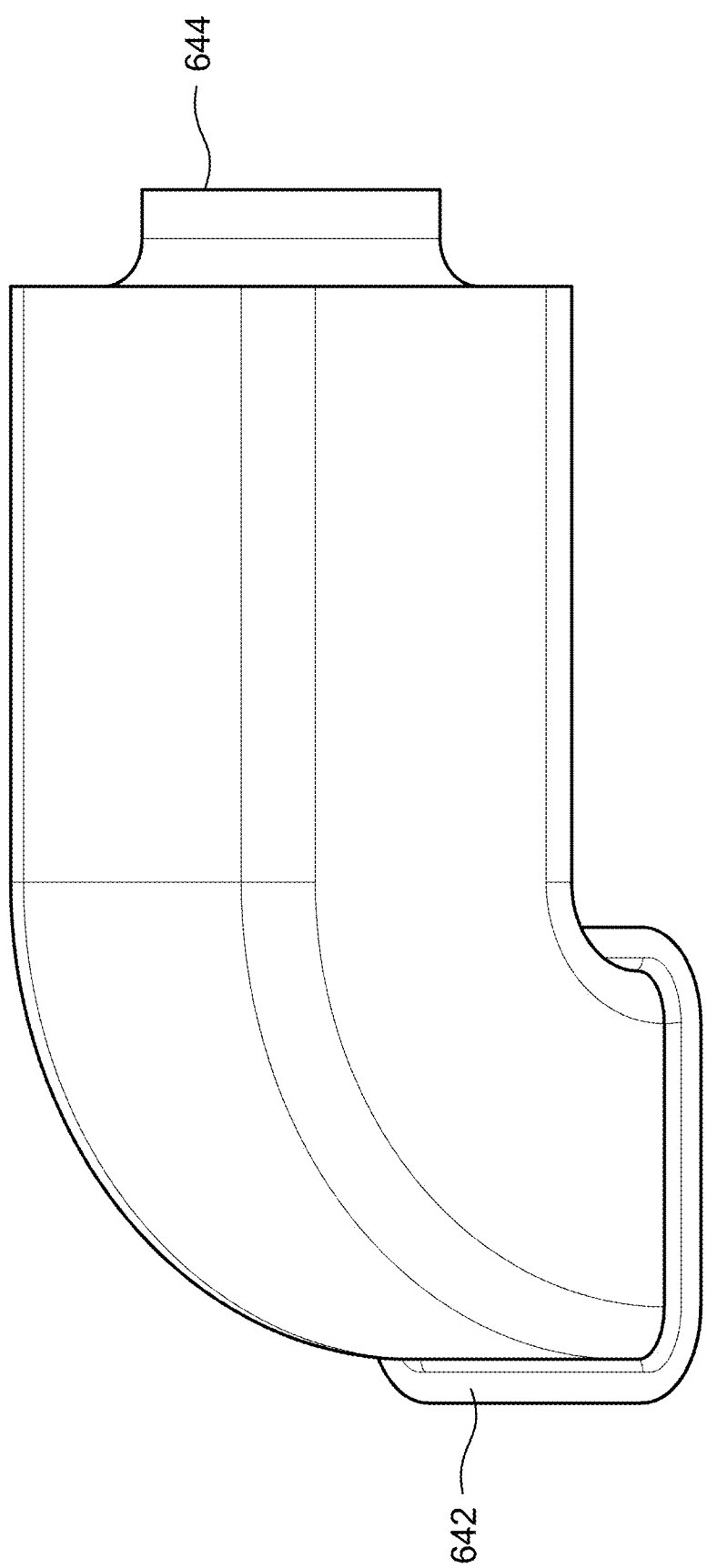
FIG. 6J illustrates a substrate pasteurization tank substrate supply duct according to an embodiment of the disclosure.

FIG. 6J illustrates a substrate pasteurization tank substrate supply duct according to an embodiment of the disclosure. Port 642 may join a pasteurization tank top to allow a flow of chopped substrate into a tank. Port 644 may provide a connector for a blower hose to receive blown, chopped substrate according to an embodiment. In some embodiments, port 644 may be shaped to form a scoop or funnel for receiving manually or automatically fed chopped substrate.

Figure 6K:
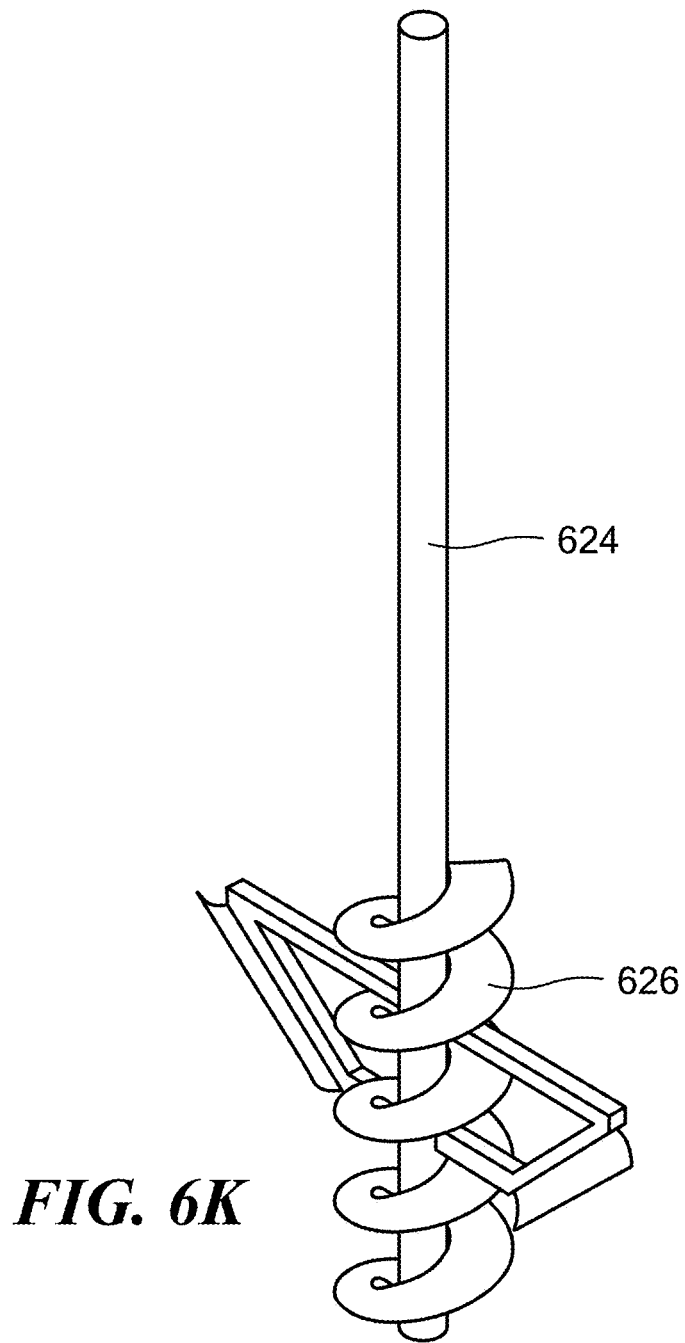
FIG. 6K illustrates a substrate pasteurization tank agitator according to an embodiment of the disclosure.

FIG. 6K illustrates a substrate pasteurization tank agitator 624 and blades 626 according to an embodiment of the disclosure.

Figure 6L:
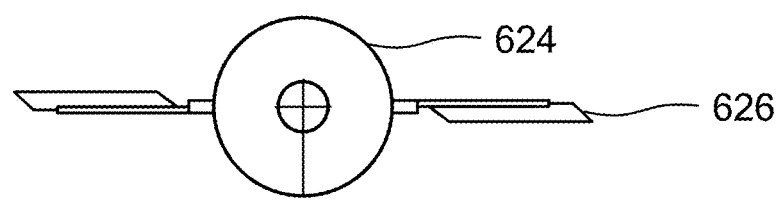
FIG. 6L illustrates a substrate pasteurization tank agitator according to an embodiment of the disclosure.

FIG. 6L illustrates a substrate pasteurization tank agitator 624 and blades 626 according to an embodiment of the disclosure.

Figure 6M:
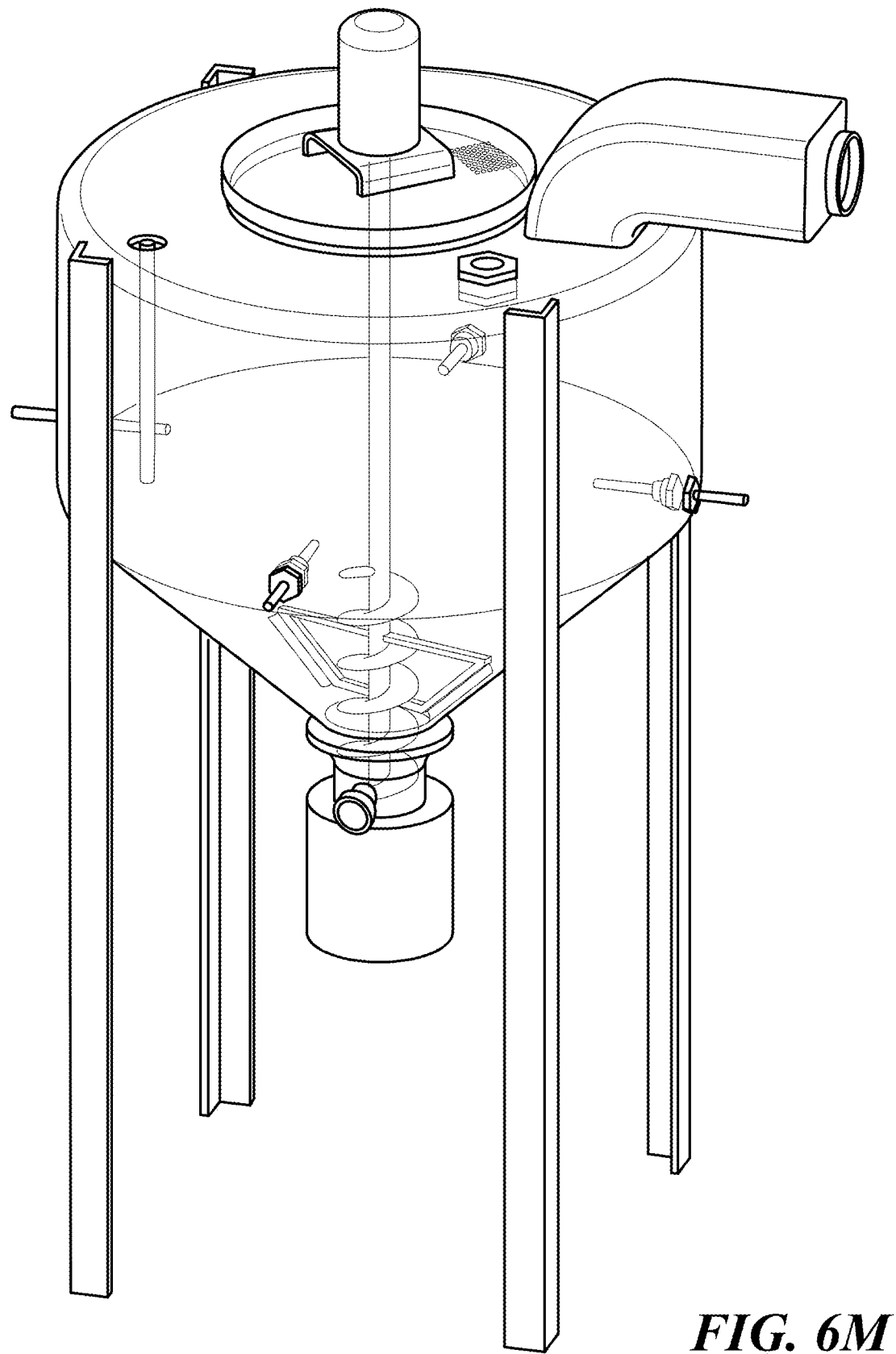
FIG. 6M depicts a cross-sectional view of a substrate pasteurization tank according to an embodiment of the disclosure.

FIG. 6M depicts a cross-sectional view of a substrate pasteurization tank according to an embodiment of the disclosure. Straw can be pasteurized to be an effective substrate for fungi (e.g., mushrooms). Improperly pasteurized straw may contain too many microorganisms to allow the mushroom mycelium to grow properly in their early stages of development, or they can grow too slowly.

Pasteurization can be a first step in the prep room. Chopped straw can be fed into a pasteurization tank from the straw storage room, either by hand or with a chopper/blower. Then, water can be preheated (e.g., using a propane water heater) and fed into a tank on top of dry chopped straw. Feeding the water in the top may prevent straw from floating to the surface and may ensure that straw is thoroughly saturated with water.

Once the tank is filled with water, one or more tank heaters (e.g., four immersion heaters) may be controlled by a temperature controller and probe to keep the tank at a constant temperature. If temperature is hard to maintain in some environments, insulation can be added to the tank design.

The agitator/auger inside a pasteurization tank can be turned backwards during soaking to ensure even mixing. After soaking, an agitator/auger can be turned forwards to force the straw out the bottom of the tank.

The agitator/auger may be turned by a standard AC gear motor. An agitator/auger can be left unsupported inside the tank, and may simply rests on the lid section with a shaft collar.

As the straw is ejected from the pasteurization tank, a conveyor below the tank valve 654 can be turned on. Both the conveyor and the auger for the pasteurization tank can be controlled by a switch on the wall where an operator can stand. This allows the operator to coordinate the bagging with the substrate exiting the tank and allow the operator to ensure an even flow of substrate.

A conveyor can be gently inclined to get from the ejection point of the tank (e.g., tank valve 654) to an intake of the bagging system. The conveyor may be cleated. It some embodiments, a conveyor may include one or more guards and other systems to ensure the substrate stays on during transport (and to encourage drainage if necessary).

A bagging and inoculation system as illustrated in FIG. 1F may include bagger 180, inoculation system 190 and conveyor 178, according to an embodiment of the disclosure. Conveyor 178 can carry the wet substrate into the intake hopper of a bagging machine. The bagging machine can include an automatic bag weigher that fills the bags to a same approximate level every time. A level may be configurable.

As the substrate passes into the bag, a passive inoculation system can be triggered. This may include a basic spoked wheel that is turned by the passing substrate underneath and releases grain spawn from a hopper as it turns.

Figure 7:
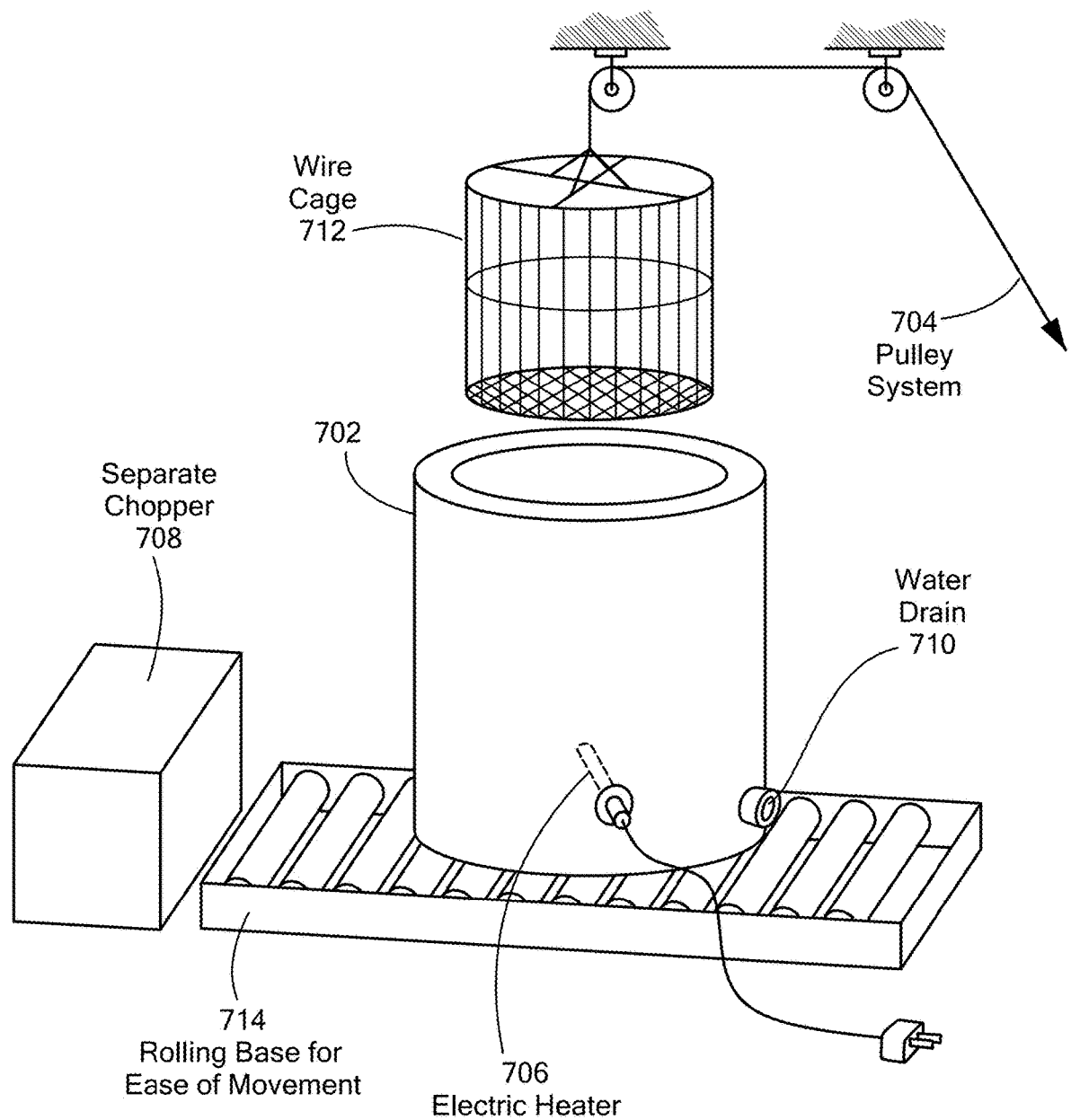
FIG. 7 illustrates an alternative substrate pasteurization system according to an embodiment of the disclosure.

FIG. 7 illustrates an alternative substrate pasteurization system according to an embodiment of the disclosure. As illustrated in FIG. 7, wire cage 712 may be used to submerge, via pulley system 704, substrate into container 702 for pasteurization. Container 702 may contain water drain 710 and heater 706. Container 702 may rest on rolling base 714 for transport. Substrate may be prepared by chopper 708.

Figure 8:
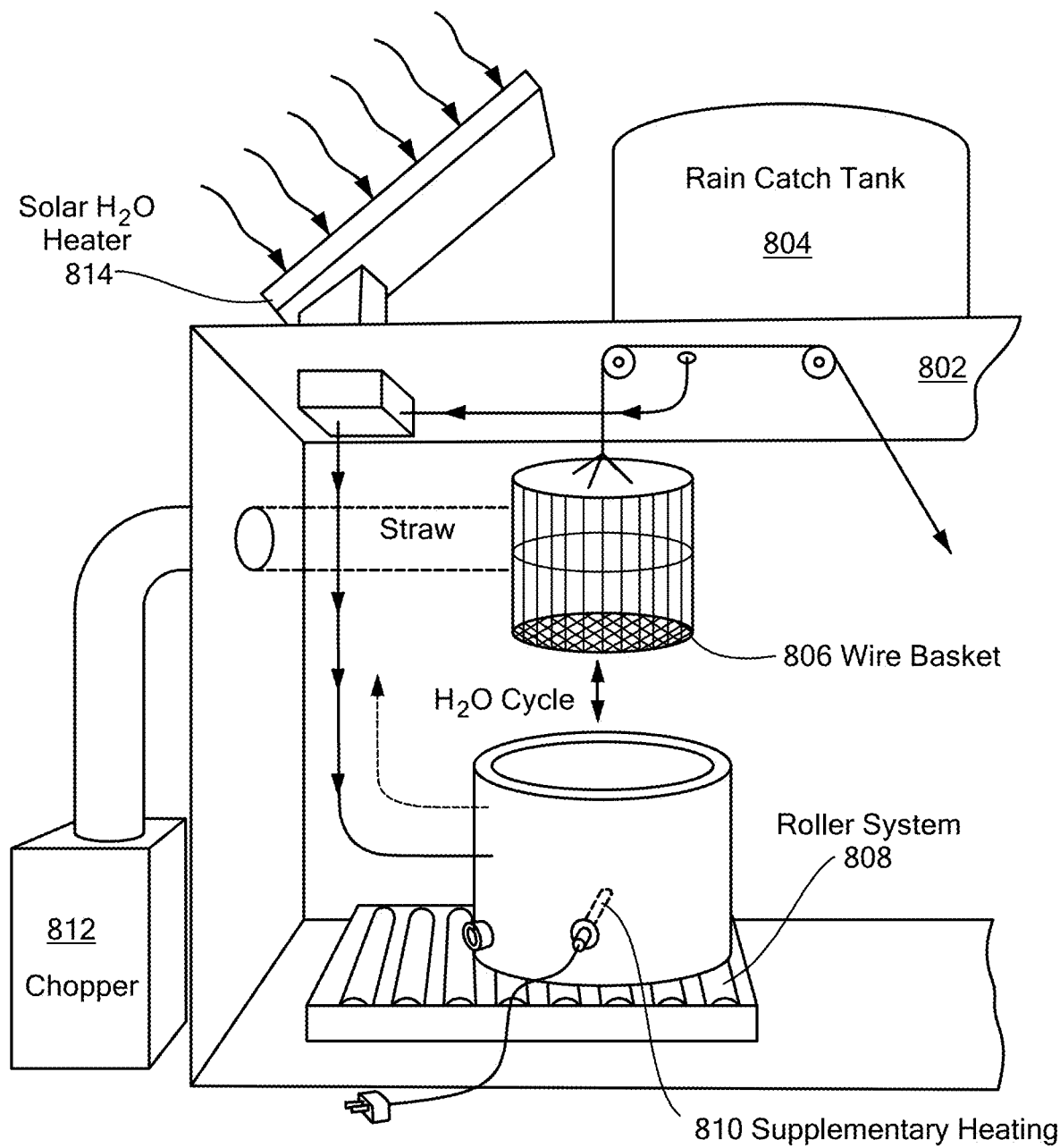
FIG. 8 illustrates another alternative substrate pasteurization system according to an embodiment of the disclosure.

FIG. 8 illustrates another alternative substrate pasteurization system according to an embodiment of the disclosure. Wire basket 806 may be used to pasteurize substrate in a pasteurization tank via a pulley. A pasteurization tank may be supported on a roller system 808. A pasteurization tank may include a heater 810. A container 802 may surround a pasteurization tank. Rain catch tank 804 may be on a roof of container 802 and may provide water for pasteurization. Solar water heater 814 may also be present on a roof of container 802. Substrate may be prepared by chopper 812.

Figure 9:
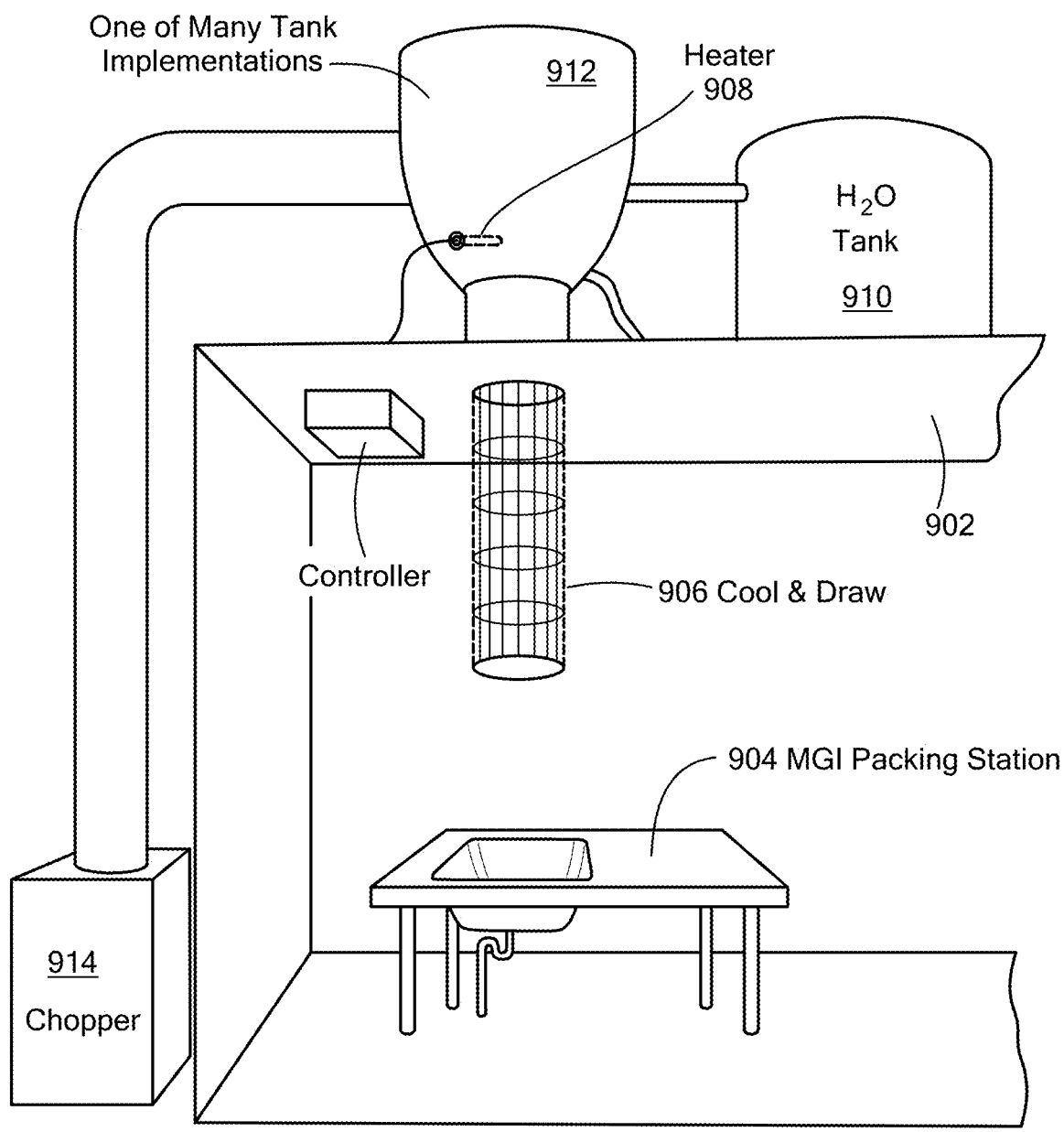
FIG. 9 depicts a substrate preparation and packaging system according to an embodiment of the disclosure.

FIG. 9 depicts a substrate preparation and packaging system according to an embodiment of the disclosure. Preparation room 902 may include a packing station 904 and a cool and drain conduit 906. Cool and drain conduit 906 may convey substrate from pasteurization tank 912, which may be on a roof of preparation room 902. Pasteurization tank 912 may include heater 908 and may receive water from water tank 910. Water tank 910 can be an intermediate bulk container or IBC tote, or it can be customer insulated steel. Pasteurization tank 912 may receive substrate from chopper 914. In some embodiments, the preparation room 902 keeps dry straw out of the work area.

Figure 10:
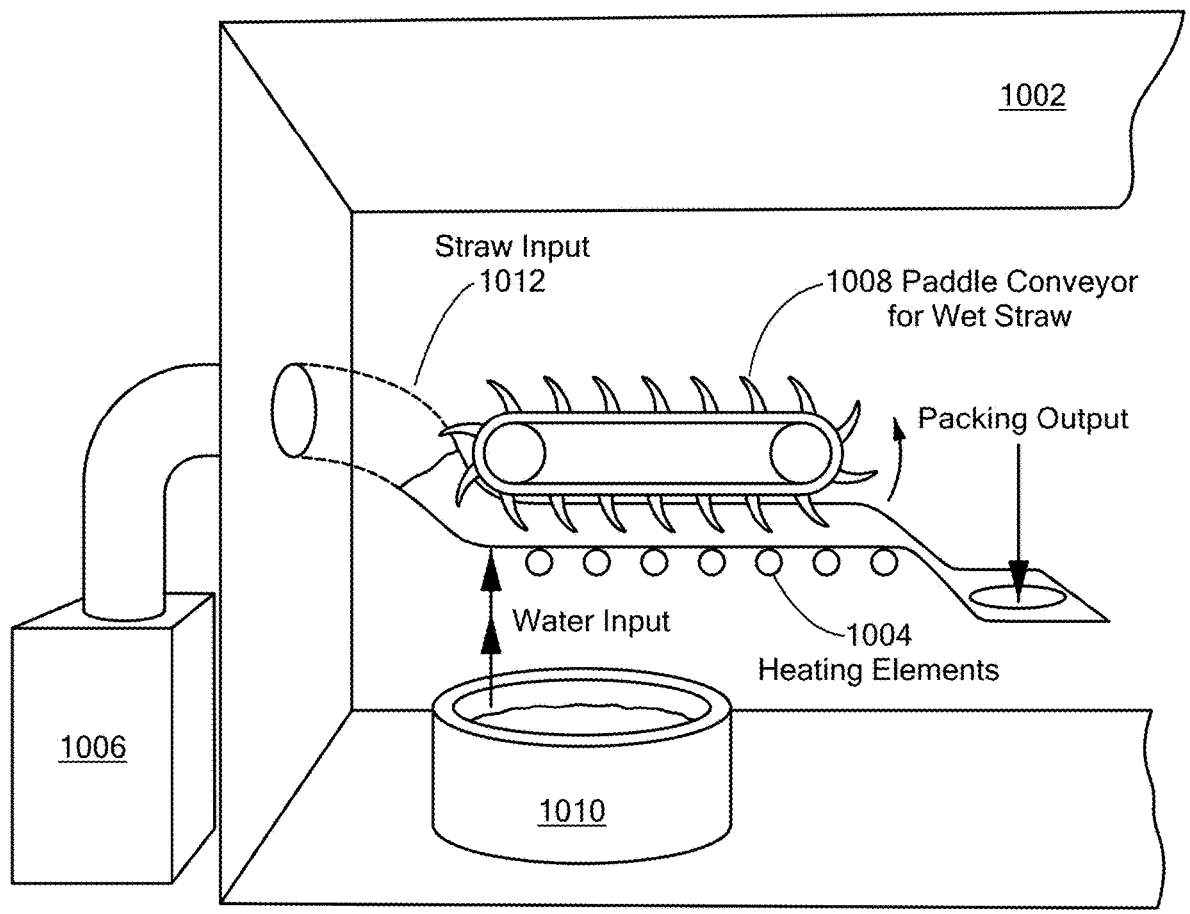
FIG. 10 depicts a substrate preparation and packaging system according to an alternative embodiment of the disclosure.

FIG. 10 depicts a substrate preparation and packaging system according to an alternative embodiment of the disclosure. Preparation room 1002 may include pasteurization tank 1010, substrate input 1012, heating element 1004, and conveyer 1008. Alternatively, heating elements can be located in the tank to heat water before the water is mixed with the substrate. A pump can also be attached to the tank to recirculate, as necessary. Substrate may be prepared by chopper and blower 1006. In some embodiments, rate matching is used in substrate preparation. Rate matching refers to matching the rates at which the substrate is chopped and fed into the processing area with the rate that the paddle conveyor turns such that the feed and conveyor are balanced. In some embodiments, a strawpacitor, or sensing mechanism, is used to match the speed the speed of the incoming substrate with the speed of the conveyor.

Figure 11:
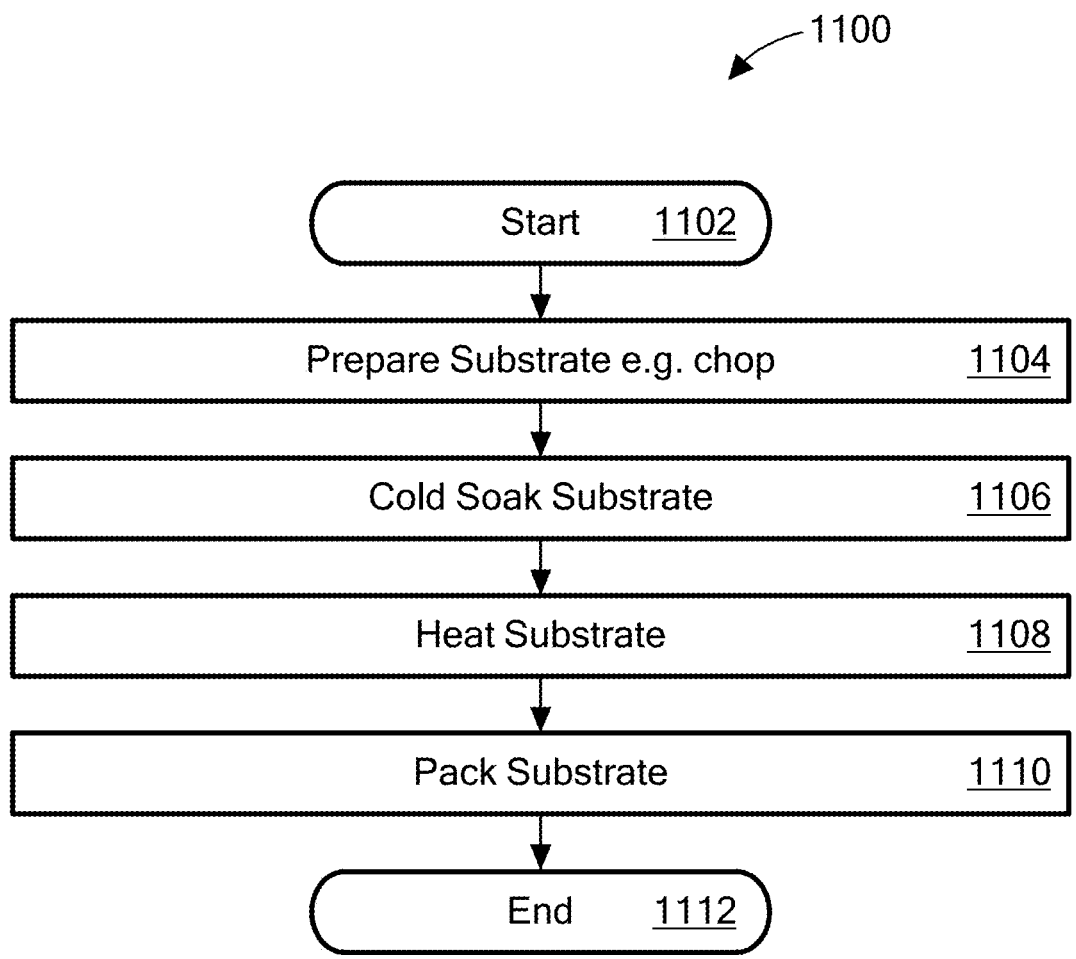
FIG. 11 shows an illustrative flow diagram of process for preparing substrate according to an embodiment of the disclosure.

FIG. 11 shows an illustrative flow diagram of process 1100 for preparing substrate according to an embodiment of the disclosure. FIG. 11 is a high level flow diagram showing processes including substrate chopping, cold soaking of substrate, heating of substrate, and packing of substrate. At block 1102 the process 1100 may begin. Preparation of substrate such as, for example, chopping of hay or other substrate may occur at block 1104. At block 1106 substrate may be soaked in a cold solution (e.g., water) for a specified period of time (e.g., 48 hours). At block 1108 substrate may be heated for a specified period of time (e.g., 48 hours). After heating substrate may be drained, inoculated, and packed at block 1110. At block 1112, the process 1100 may end.

Figure 12:
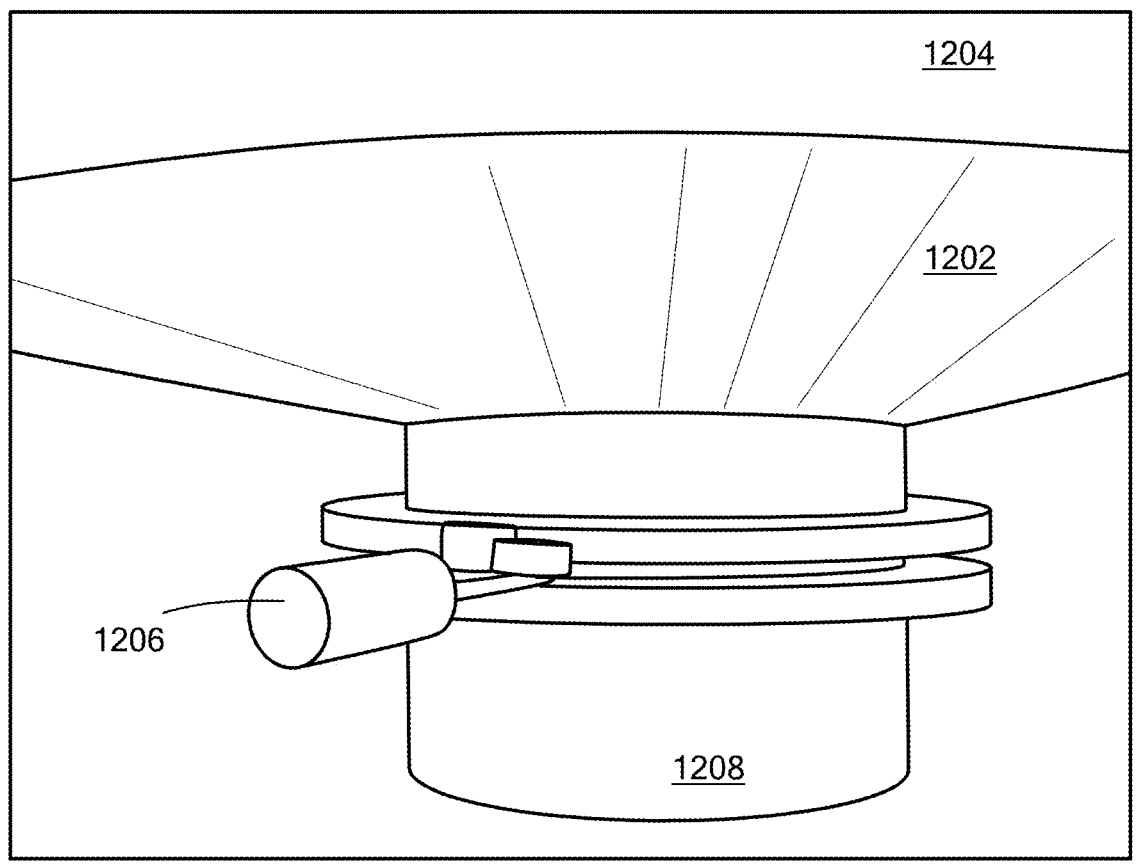
FIG. 12 depicts a container for pasteurizing substrate according to an embodiment of the disclosure.

FIG. 12 depicts an alternative container 1202 for pasteurizing substrate according to an embodiment of the disclosure. Container 1202 may include a main body 1204, a valve including valve control 1206, and a orifice 1208 for dispensing pasteurized substrate. Container 1202 may include an internal agitator (not shown) such as, for example, a grain flipper.

Figure 13:
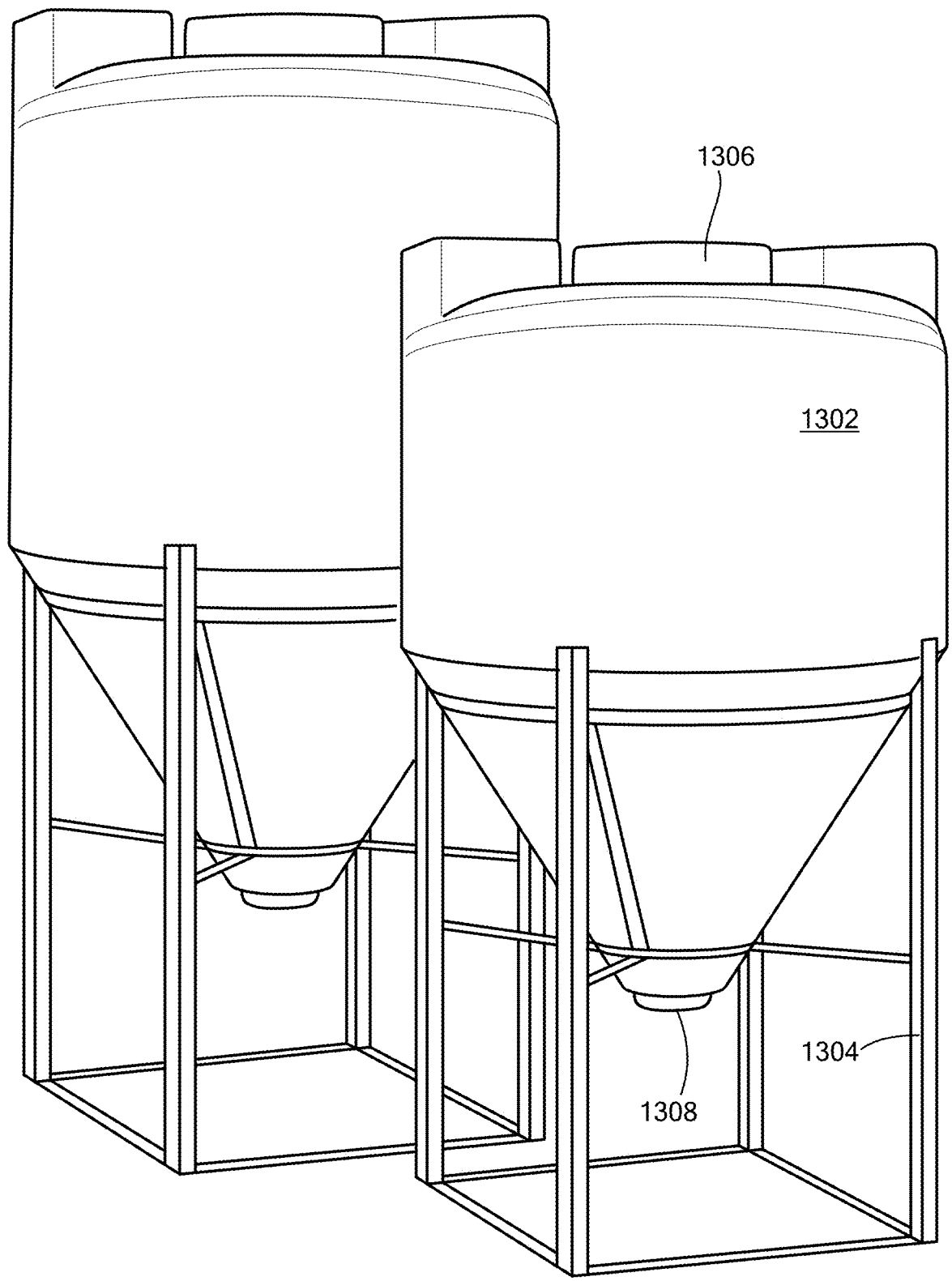
FIG. 13 depicts a containers for water according to an embodiment of the disclosure.

FIG. 13 depicts containers for water according to an embodiment of the disclosure. In some embodiments, containers 1302 may be stored on a roof of a grow container and or adjacent to a grow container. Containers 1302 may be supported by support frames 1304. Containers 1302 may include input covers 1306 and dispensing valves 1308. Containers 1302 may include an internal agitator (not shown) such as, for example, a grain flipper.

Figure 14:
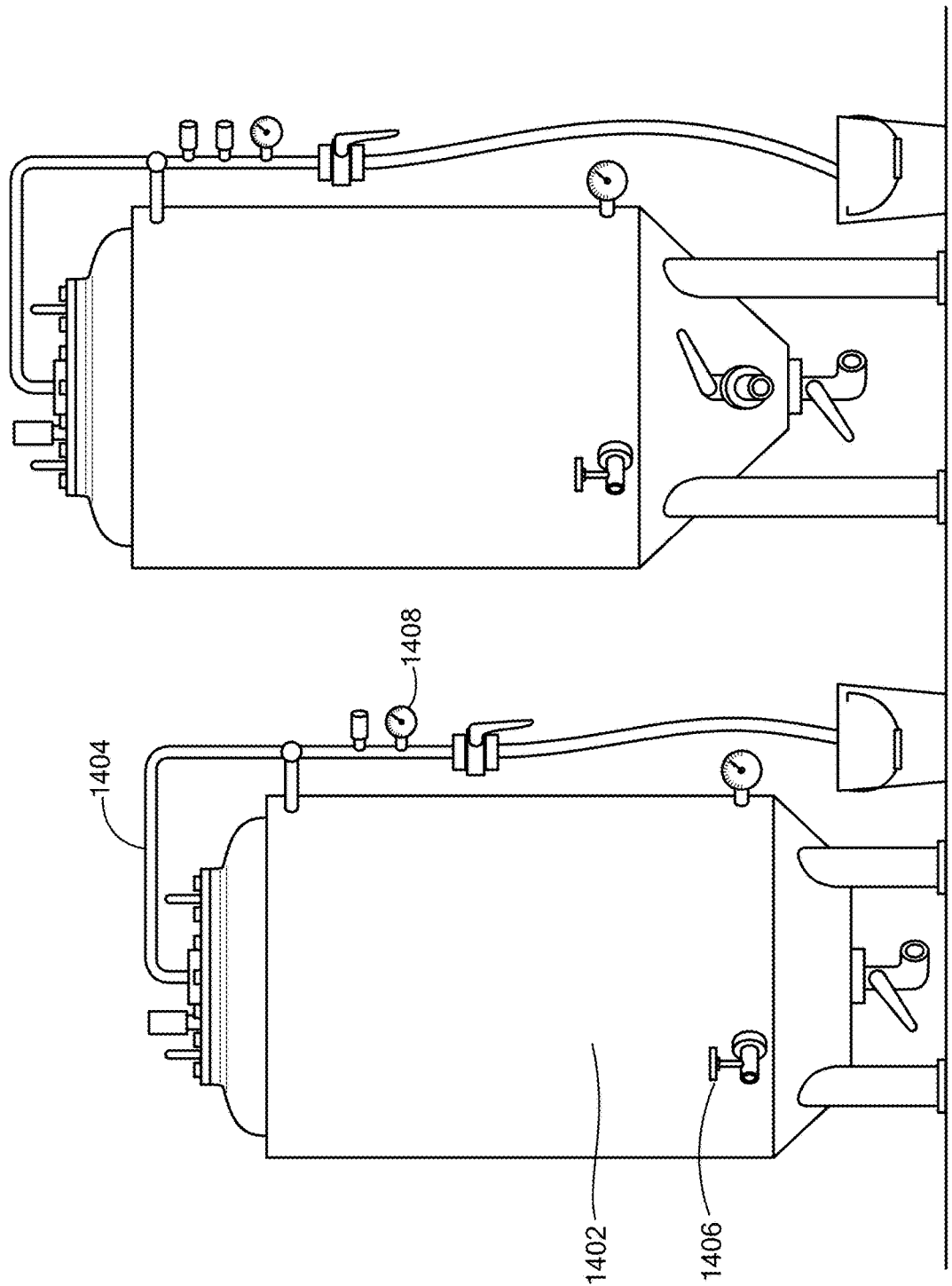
FIG. 14 depicts an alternative container for pasteurizing substrate according to an embodiment of the disclosure.

FIG. 14 depicts an alternative container 1402 for pasteurizing substrate according to an embodiment of the disclosure. Container 1402 may include input line 1404, output valve 1406 and one or more gauges 1408. Gauges 1408 may indicate temperature, pressure, or other substrate or solution input conditions.

Figure 15:
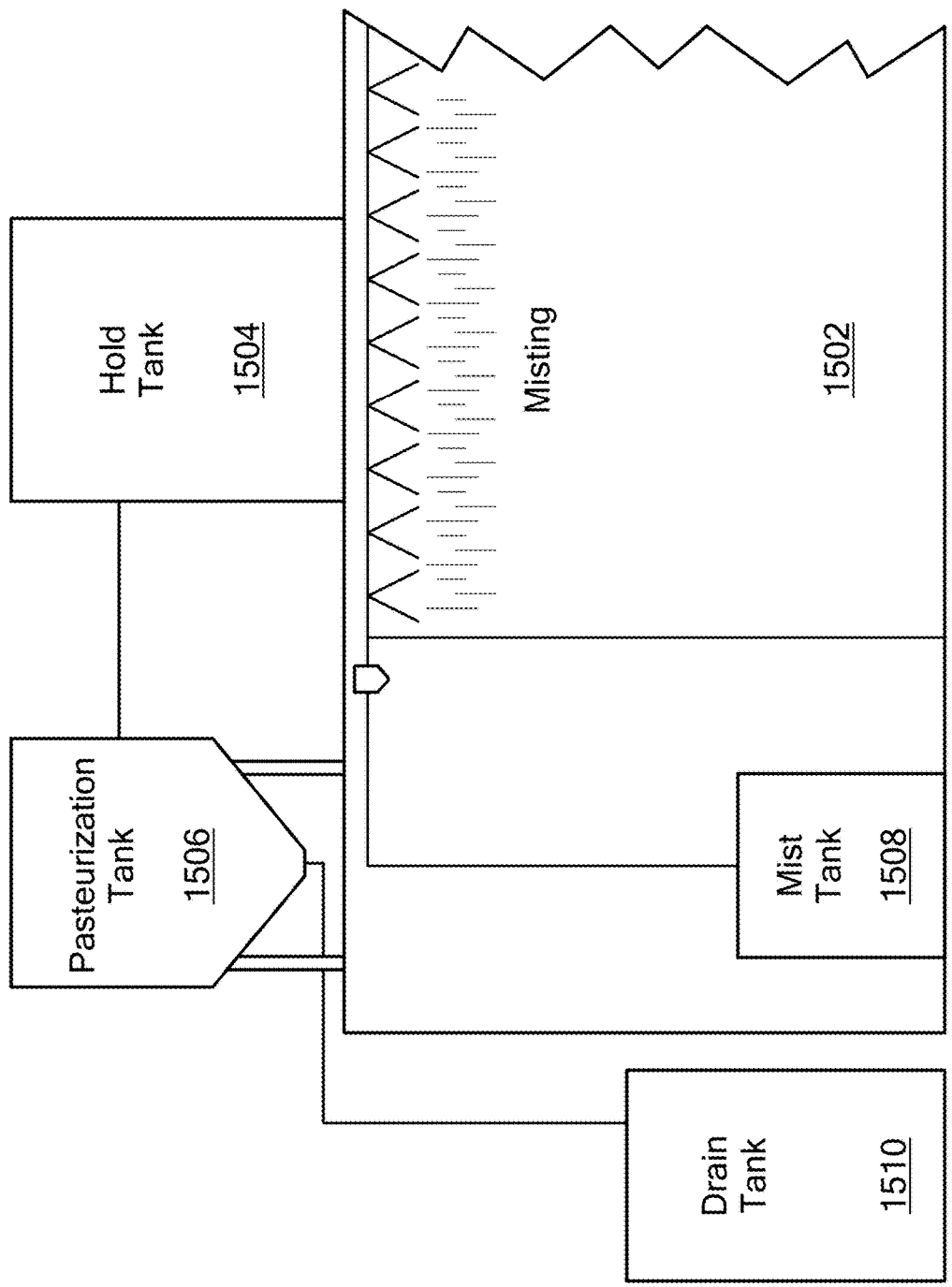
FIG. 15 is a diagram showing an arrangement of containers for water, pasteurization, water reclamation, and misting according to an embodiment of the disclosure.

FIG. 15 is a diagram showing an arrangement of containers for water, pasteurization, water reclamation, and misting according to an embodiment of the disclosure. Grow container 1502 may support holding tank 1504 which may supply fluids to pasteurization tank 1506. Pasteurization tank may drain fluids (e.g., water) into drain tank 1510. Misting in grow container 1502 may be supplied by mist tank 1508.

Figure 16:
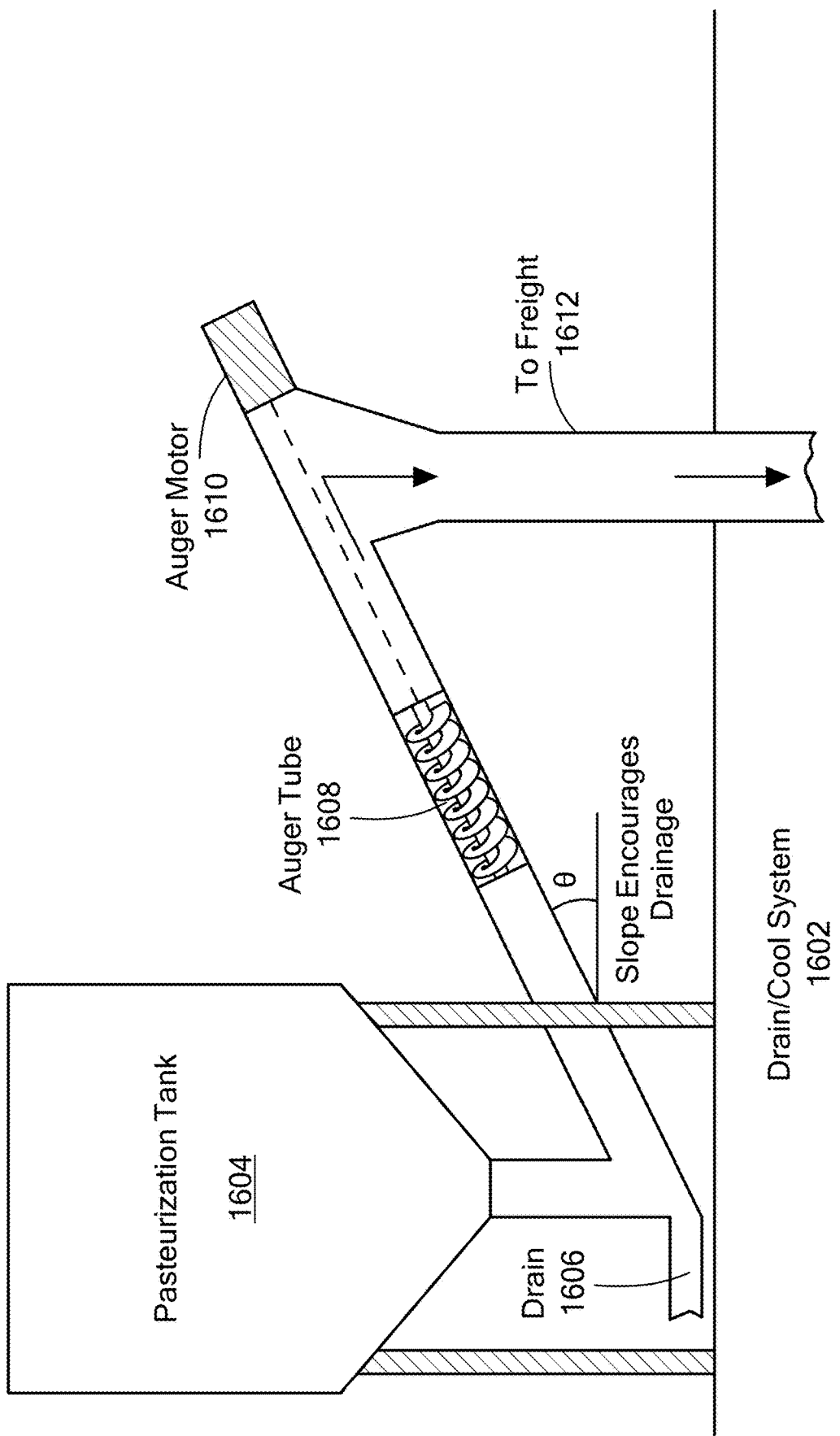
FIG. 16 shows a schematic arrangement of a pasteurization container, a substrate cooling and drying apparatus, and a substrate packing supply passage according to an embodiment of the disclosure.

FIG. 16 shows a schematic arrangement of a pasteurization container, a substrate cooling and drying apparatus, and a substrate packing supply passage according to an embodiment of the disclosure. Pasteurization tank 1604 may drain water into drain 1606. Pasteurized substrate may be transported from pasteurization tank 1604 up auger tube 1608 by an auger driven by motor 1610. A slope of auger tube 1608 may encourage draining to drain 1606 while cooling substrate conveyed upwards by an auger may be supplied to packing supply tube 1612. According to some embodiments, packing supply tube 1612 may be a substantially vertical tube for transferring substrate to an inoculation and packing system.

Inoculation

Inoculation may involve inserting fungi spores into a substrate. Different methods and different types of spores may be used depending on a type of fungi to be grown, a substrate used, and other factors. Inoculation may, for example, be performed by mixing a grain spawn into a substrate (e.g., dispensing grain spawn via a hopper into a grow container or grow bag). Inoculation may also be performed by injecting a liquid culture into a substrate (e.g., injecting a liquid culture into a grow bag at one or more locations).

Figure 17:
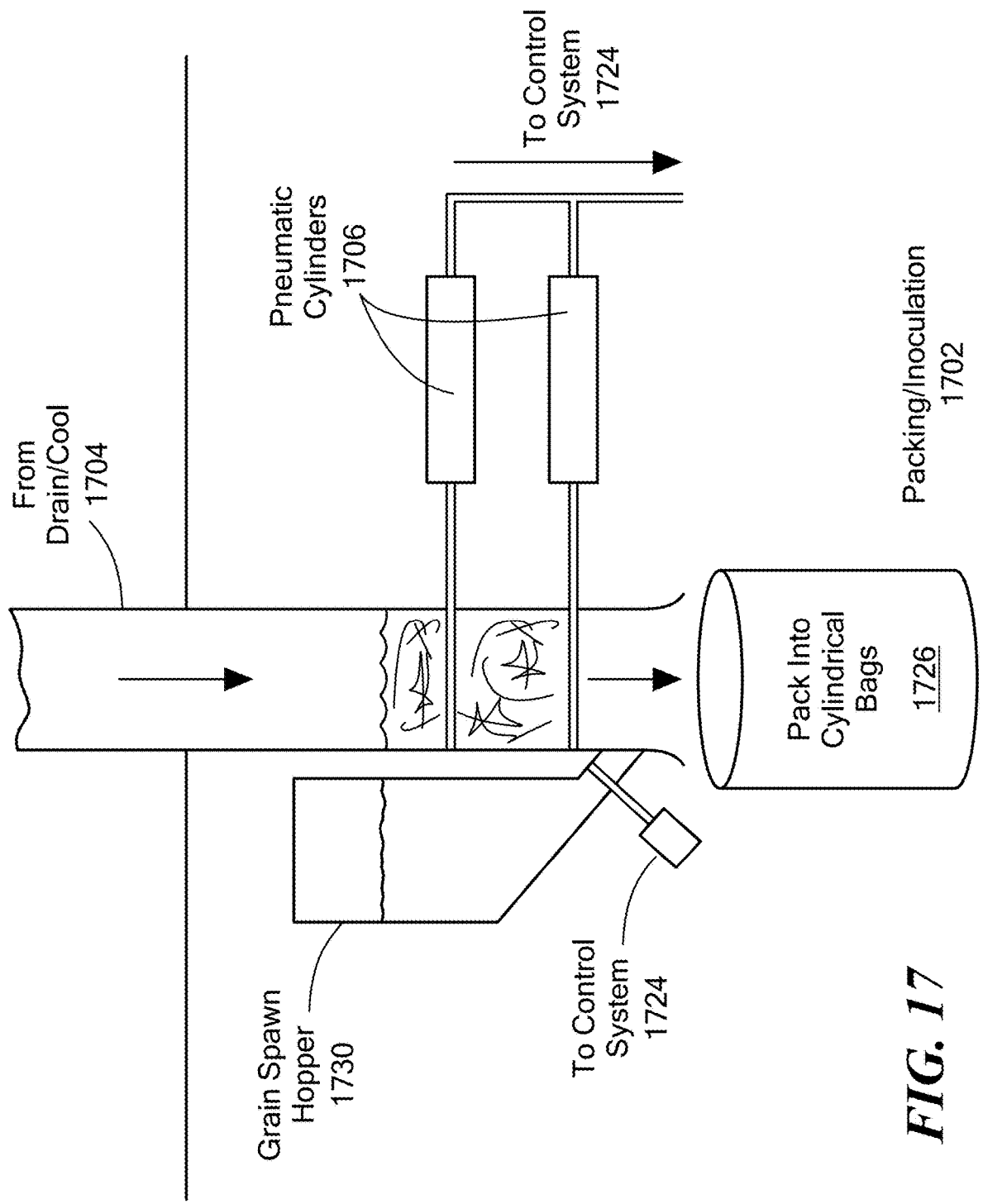
FIG. 17 depicts an inoculation and packing apparatus according to an embodiment of the disclosure.

FIG. 17 depicts an inoculation and packing apparatus according to an embodiment of the disclosure. According to some embodiments, one or more portions of a packing and inoculation infrastructure may be integrated into a packing tube 1704. In some embodiments, a packing tube may descend into a preparation area from a rooftop pasteurization system. A packing system may consist largely of one or more sliders (e.g., upper and lower sliders) that determine a size of one layer of the substrate to be packed. For example, a bottom slider or other mechanical divider may form a barrier in a portion of a packing tube. Substrate may rest on this mechanical divider and until an adequate portion has been stacked. A top mechanical divider or slider may determine a size of a substrate portion to be packed by sealing off a flow of substrate into a packing tube once a specified amount of substrate has been accumulated on a lower mechanical divider or slider. In parallel with these mechanical dividers or sliders one or more other sliders may control injection of the grain spawn into the substrate. The combined packing/inoculation system layers the substrate with the spawn to fill the grow containers 1726 (e.g., bags). According to some embodiments, grow containers may be between 10" and 14" diameter cylinders and approximately 24" tall. Grow containers may be provided in other diameters and heights. As illustrated, one or more mechanical dividers or sliders may be driven by pneumatic cylinders 1706 or other actuators. Pneumatic cylinders 1706 or other actuators may be communicatively coupled to a control system 1724, which may determine an amount of substrate per growing unit, a number of inoculations, an amount of grain spawn, and other factors. In some embodiments, a grow container may not be inoculated via a pneumatic cylinder or other actuator. In some embodiments, grain spawn may be dispensed from a grain spawn hopper 1730 or another container into a grow container. Grain spawn hopper 1730 may be communicatively coupled to control system 1724. Control system 1724 may coordinate the timing of dispersal of grain spawn from grain spawn hopper 1730 with the timing of a slider or divider so that grain spawn may be dispersed in one or more layers in a grow container.

Growth Environment

The growth environment may be a modified shipping container, altered to provide an optimized environment for preparing fungi growth bags or other containers, monitoring and controlling the growth of fungi, and harvesting fungi. A growth environment may be divided into a plurality of areas to allow separate growth bag preparation areas and one or more grow areas. One or more airlocks may be provided to reduce contamination. A growth preparation area may provide space and/or apparatus for one or more of preparing substrate, pasteurizing substrate, inoculating substrate, and packing substrate. A growing container may contain a control system for regulating and/or monitoring a growth environment.

Figure 18A:
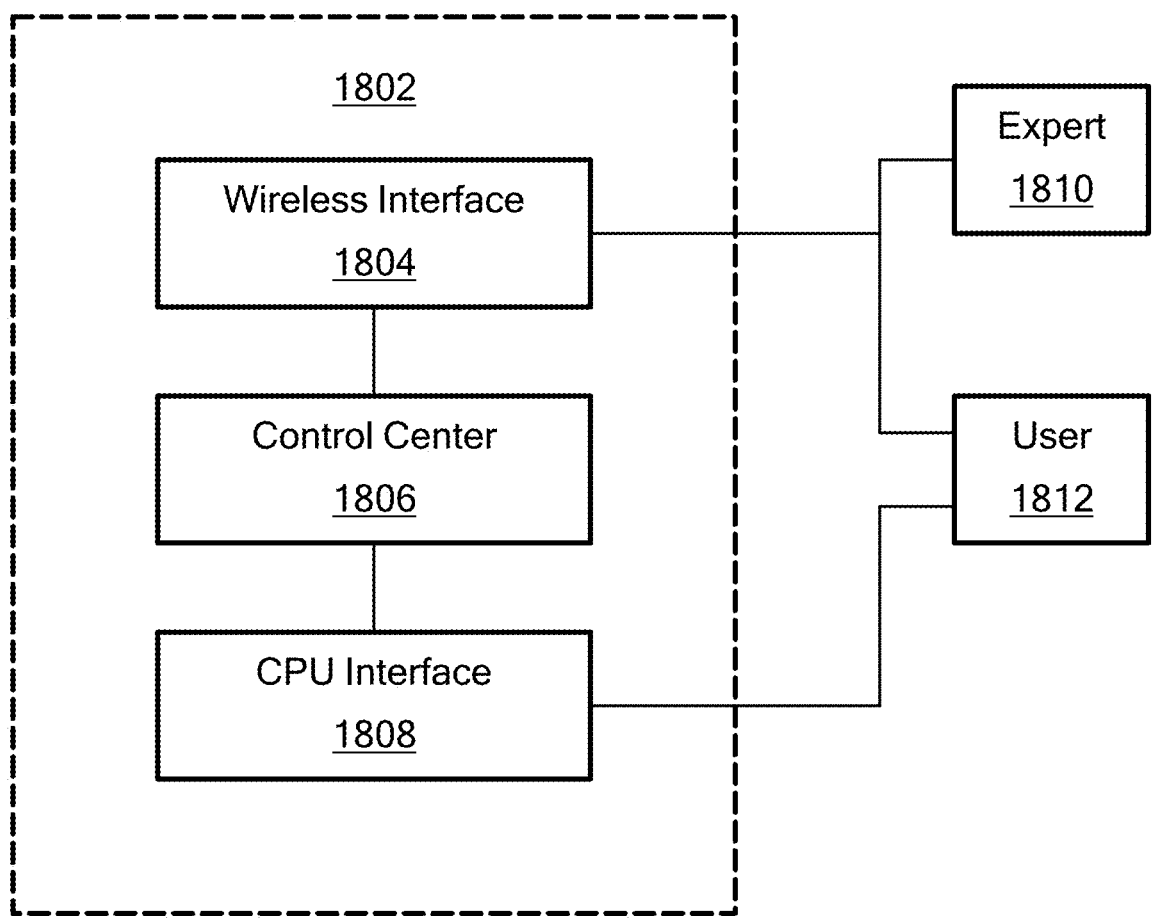
FIG. 18A depicts a grow container control system according to an embodiment of the disclosure.

FIG. 18A depicts a growing container control system according to an embodiment of the disclosure. Grow container control system 1802 may include control center 1806, CPU interface 1808, and wireless interface 1804 to allow user 1812 to access the system remotely. Control center 1806 preferably monitors and controls all of the components based on specifications set by user 1812. For example, control center 1806 can monitor a climate control system and change humidity, carbon dioxide levels, temperature, and other factors in order to remain within user-specified measurements. In yet another example, control center 1806 can be coupled to the ventilation system to ensure the proper airflow is being maintained for various sections of fungi. The above are just illustrative examples of components that can be monitored and controlled in order to ensure maintenance of optimal growing conditions specified by the user.

CPU interface 1808 allows user 1812 to have direct access to control center 1806, and wireless interface 1804 allows user 1812 to have remote access to control center 1806. Either connection allows user 1812 to modify any pre-set levels, override pre-set levels, or simply monitor activity in a container. Wireless interface 1804 allows for control center 1806 to provide remote alerts to user 1812, giving user 1812 the ability to change or override any preset characteristics. In another embodiment, the wireless connection allows for an additional party, such as off-site harvest expert or growing expert 1810, to communicate with user 1812 and review all of the data and conditions that are available to user 1812.

One of ordinary skill in the art would recognize that the monitoring system could monitor, control, and change any additional components that affect the environment or feeding conditions. In order to maintain conditions or provide alerts, control center 1806 can include algorithms relating to environmental conditions prescribed by the user. In one embodiment, control center 1806 utilizes a series of if-then relationships to maintain optimal conditions. For example, if humidity within a container falls below a specified amount, then control center 1806 activates the humidifier until the humidity level stabilizes. In another example, if the temperature within container rises above or below a specified level, then control center 1806 activates a climate control system until the temperature stabilizes. A monitoring system can also be configured to capture visual records of fungi growth, and record and report all data points for conditions that the monitoring system controls. The system may also be configured to issue alerts based on the if-then relationships described above to alert the user of system failures, changes in conditions, or other variations from levels prescribed by the user. All of these variables can be changed based on the crop desired and the optimal environmental and feeding conditions for that crop.

Figure 18B:
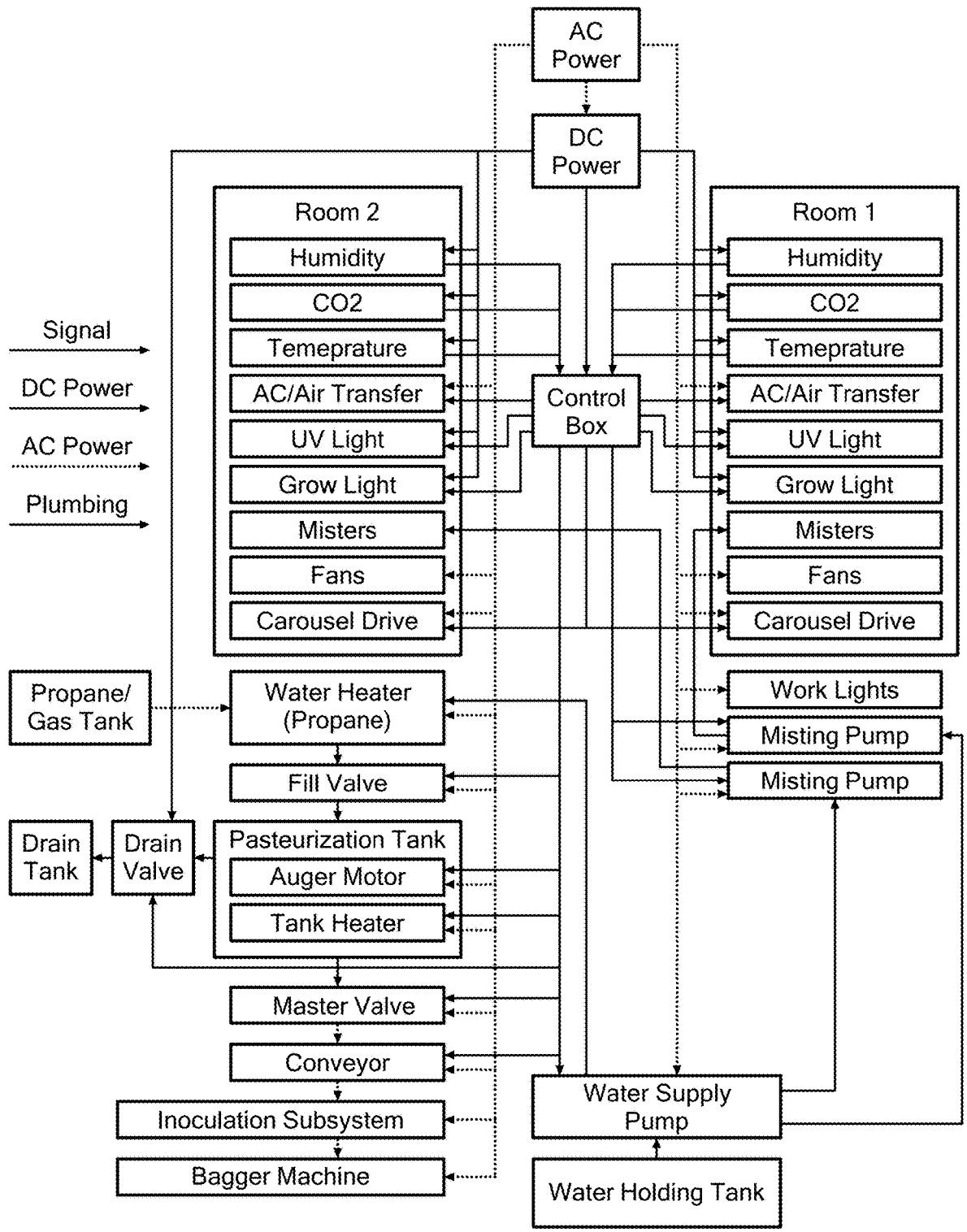
FIG. 18B depicts a grow container electrical diagram according to an embodiment of the disclosure.

FIG. 18B depicts a grow container electrical diagram according to an embodiment of the disclosure. As illustrated, A/C power may be converted to D/C power and provided to a plurality of components, such as, for example, one or more controllers, humidity sensors, $CO_2$ sensors, temperature sensors, air conditioning, lights, grow lights, misters, fans, carousels (e.g., motors), a misting pump, a water pump, one or more heaters, valves, agitators, augers, conveyors, baggers, vents, inoculation systems, etc. Control signals may be sent from and received by one or more controllers. Signals may be sent to or received from sensors (humidity, temperature, $CO_2$, fluid levels, weights, etc.), air conditioning, lights, heaters, fans, carousels, valves, agitators, augers, conveyors, baggers, misters, pumps, vents, inoculation systems, and other components. Water and/or other fluids may be received from or supplied to one or more components such as, for example, pumps, containers, valves, a pasteurization tank, a water heater, a drain, a holding tank, a waste tank, a mister, etc.

FIG. 19A depicts a growth medium support structure according to an embodiment of the disclosure. According to some embodiments, growth medium support structures may provide vertical racks, shelves, or platforms for supporting one or more containers or bags of pasteurized and inoculated substrate (e.g., grow bags). Grow bags may be supported on a growth medium support structure 1902 (e.g., 3 feet tall carousel trees). The growth medium support structures may each contain a plurality of bags, stacked on top of each other, directly below hanging point 1904. Each grow room may have a motorized carousel that carries the bags to a user one growth medium support structure at a time. Each growth medium support structure may have a plurality of trays or platforms 1906 and 1908 for supporting grow bags.

FIG. 19B depicts a growth medium support structure according to an embodiment of the disclosure. The growth medium support structures (e.g., grow trees) can be made from self-jigging sheet metal punched and welded together. Each grow tree may consist of a series of pentagonal flat pieces to support the grow bags, and sides to provide lift and stiffness. Holes can be provided in the support structure in case it is necessary to support the grow bags laterally (i.e., they can be tied in).

The carousels may allow the operator to remain standing in a single place while accessing the entire crop in multiple grow rooms during the grow period and for loading and harvest times. The carousels can be controlled by Forward/Reverse controllers that may be integrated with the carousels (e.g., customized PACLINE carousels). Grow trees can be mounted to the carousel load bars with swivel hooks (not shown) such that the operator can rotate each grow tree independently.

Figure 20:
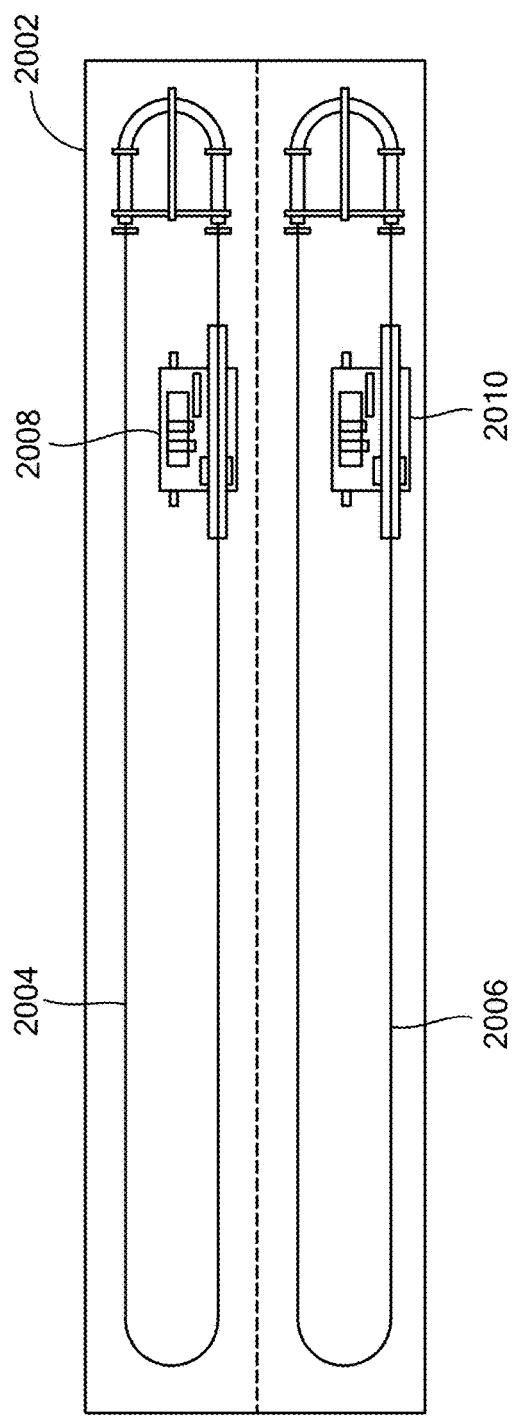
FIG. 20 depicts a growth medium support structure conveyor arrangement according to an embodiment of the disclosure.

FIG. 20 depicts a growth medium support structure conveyor arrangement according to an embodiment of the disclosure. As depicted in FIG. 20, a separate conveyor or carousel may be utilized for each growing area of a container 2002. For example, a first growing area may contain carousel 2004 powered by motor 2008 and a second growing area may contain carousel 2006 powered by motor 2010.

Figure 21:
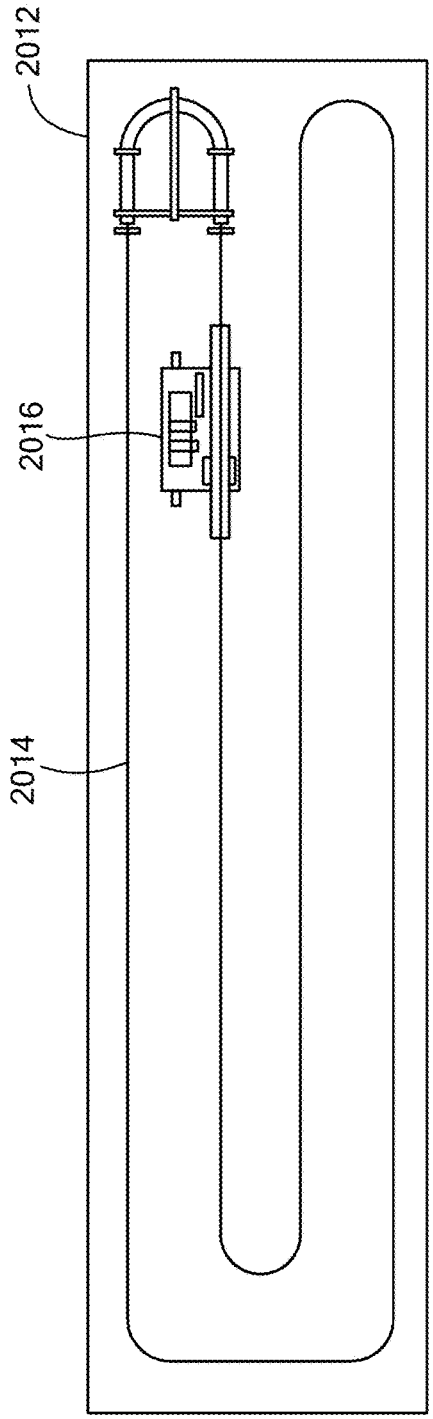
FIG. 21 depicts an alternative growth medium support structure conveyor arrangement according to an embodiment of the disclosure.

FIG. 21 depicts an alternative growth medium support structure conveyor arrangement according to an embodiment of the disclosure. As depicted in FIG. 21, in some embodiments, a single carousel 2014, powered by motor 2016, may be utilized for multiple growing areas of container 2102.

Remote Monitoring and Management

Remote monitoring and management may provide a user interface for monitoring one or more conditions of a growing container. Variables that may be monitored include, but are not limited to, air temperature, air flow, carbon dioxide levels, water temperature, pH level, and nutrient conductivity. Remote monitoring may include one or more audio and/or video feeds. Remote management may allow control of one or more environmental conditions including, but not limited to, air temperature, air flow, carbon dioxide levels, water temperature, pH level, and nutrient conductivity. As discussed in further detail with respect to FIGS. 22-25 below, one or more user interfaces may be provided to monitor and/or control one or more environmental variables.

Figures 22, 23:
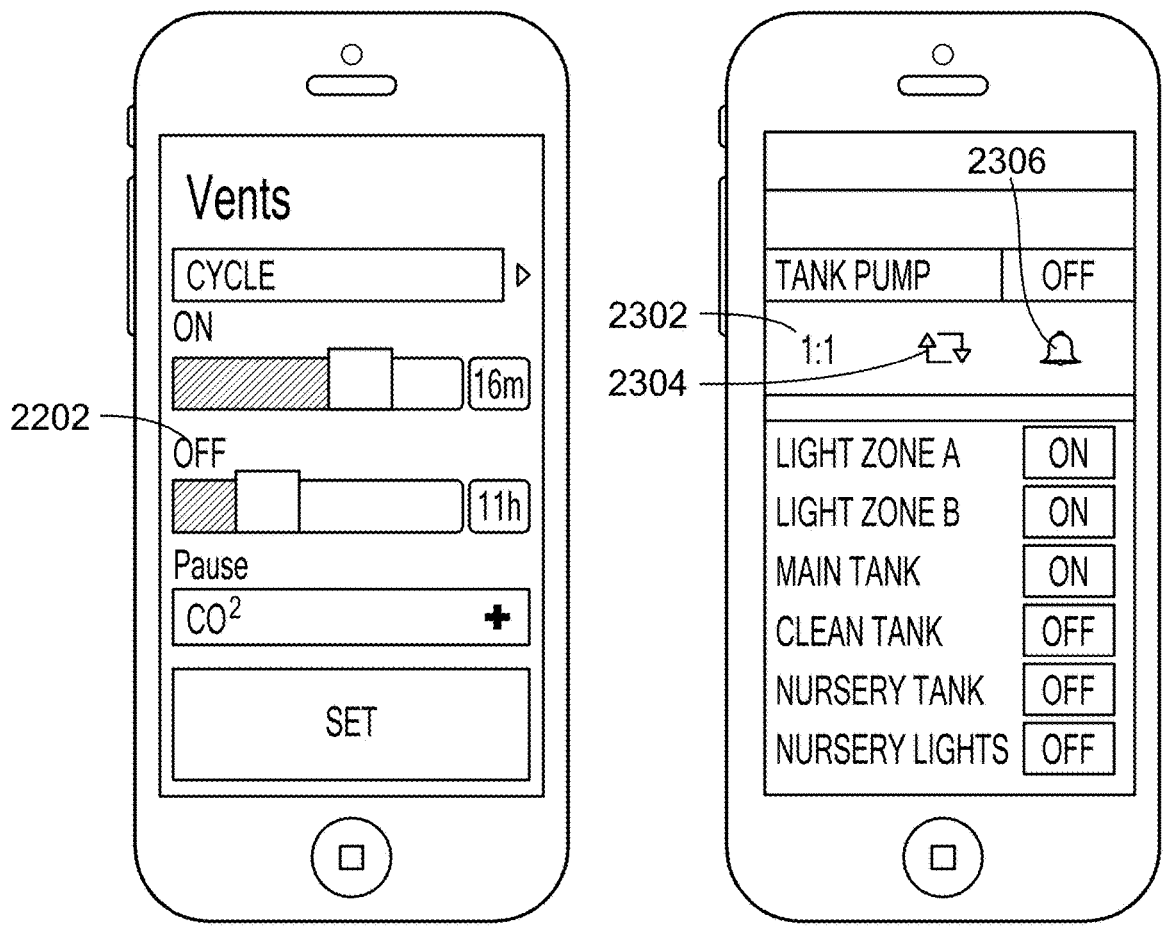
FIG. 22 shows examples of data that can be remotely monitored and controlled via the illustrative monitoring system, all according to embodiments of the disclosure.
FIG. 23 shows further examples of data that can be remotely monitored and controlled via the illustrative monitoring system, all according to embodiments of the disclosure.

FIG. 22 shows examples of data that can be remotely monitored and controlled via the illustrative monitoring system, all according to embodiments of the disclosure. For example, FIG. 22 illustrates various vent cycle characteristics 2202 that can be remotely set and modified with respect to the vents in an embodiment of the disclosure.

FIG. 23 shows further examples of data that can be remotely monitored and controlled via the illustrative monitoring system, all according to embodiments of the disclosure. As shown in FIG. 23, when a system is selected, an exemplary set of icons 2302, 2304, 2306, pertaining to the selected system are displayed. For example, if the tank pump system is selected, an embodiment of a monitoring system might display relationship icon 2302, cycle icon 2304, and alarm icon 2306. Relationship icon 2302 describes the relationship that has been set up to determine what conditions should occur for a corresponding action to be triggered. Cycle icon 2304 allows the user to specify the number or frequency of cycles to run a particular system. Alarm icon 2306 allows the user to specify the scenarios for which a monitoring system should alert the user for a particular system.

FIGS. 24A-24D show examples of additional data that can be remotely monitored and controlled via the illustrative monitoring system, all according to embodiments of the disclosure. FIG. 24A shows a screen shot of exemplary air and water data that can be reported to the user. Such data can include air temperature 2402, air flow 2404, carbon dioxide levels 2406, water temperature 1708, pH level 1710, and nutrient conductivity 1712. 24B shows a live video feed 1714 of fungi. A monitoring system can also provide video feeds of other zones of crops being grown in a container in order to allow a user to monitor different zones of different crops or different zones of the same crop. FIG. 24C shows an example of alarm function 1716 in a monitoring system. In this example, the user has configured alarm function 1716 to notify the user when the air temperature has exceeded 82 degrees F. or has dropped below 64 degrees F. FIG. 24D illustrates additional systems 1718 that can be remotely monitored and controlled.

FIGS. 25A-25B show examples of further data that can be remotely monitored and controlled via the illustrative monitoring system, all according to embodiments of the disclosure. FIG. 25A shows systems 1720 that can be monitored by cycles, and 25B shows an example of the controls 1722 for setting cycles for a particular system.

Figure 26:
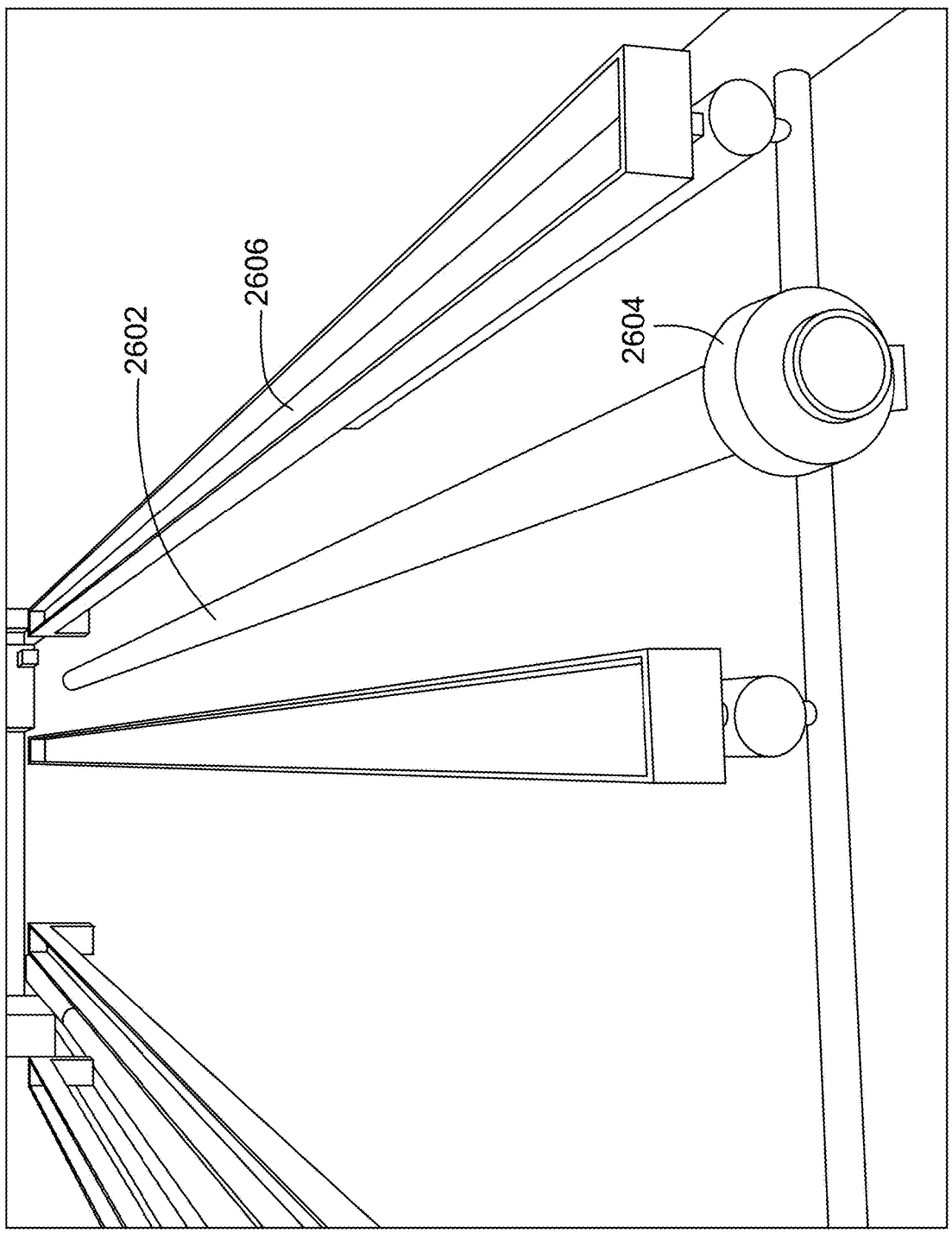
FIG. 26 shows a perspective view of an embodiment of a ventilation system.

FIG. 26 shows a perspective view of an embodiment of a ventilation system. The ventilation system can also include tube 2602, which may span along the floor of a container in any direction. In one embodiment of the disclosure, tube 2602 is positioned between, and is parallel to, a carousel supporting growth medium support structures. Tube 2602 includes end 2604, which is configured to receive a fan unit (not shown), as well as perforations (not shown) along the length of tube 2602. When the fan unit (not shown) is turned on, air is circulated along the length of tube 2602, and is released upward through the perforations (not shown) along tube 2602 as an alternative or additional vertical air source. One of ordinary skill in the art would recognize that air can flow vertically from either the ceiling to the floor, or from the floor to the ceiling, of a container. One of ordinary skill in the art would also recognize that air flow in the horizontal and vertical directions is just an example and the embodiment is not limited to only two directions, nor is it limited to those two particular directions.

The system can be configured to produce fungi, and all plants including root crops. For example, the system can produce: all types of lettuce; all types of herbs such as basil, oregano, mint, parsley, rosemary, thyme, and chive; all types of leafy greens such as kale, chard, spinach and arugula; all vine crops such as strawberries, tomatoes, and peppers; cucumbers; and mushrooms. One of ordinary skill in the art would recognize that these are just examples of non-root crops, and the disclosure is not meant to be limited to these exemplary crops only. The system can also be configured to utilize fish tanks in order to raise various forms of seafood, such as fish, shrimp and lobsters.

The disclosed system can provide the utmost efficiency as fungi can be harvested and new fungi can begin the cycle all in the same space at the same time.

Although the above description describes embodiments of the invention, it should be understood that the techniques and concepts are applicable to growing systems in general. Thus the invention may be embodied in other specific forms without departing from the spirit or essential characteristics thereof.

While the above describes a particular order of operations performed by a given embodiment of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the present invention has been described in the context of a method or process, the present invention also relates to apparatus for performing the operations herein. This apparatus may be specially constructed for the required purposes, or it may include a general-purpose computer selectively activated or reconfigured by a computer program stored in the computer. Such a computer program may be stored in a computer readable storage medium including, without limitation, any type of disk including optical disks, CD-ROMs, and magnetic-optical disks, read-only memory (ROM), random access memory (RAM), magnetic or optical cards, or any type of media suitable for storing electronic instructions.

The invention claimed is:

1. A system for generating high-yield plant production, the system comprising:
   at least three rooms within each of one or more containers;
   a grow area disposed within each of at least a first room and a second room of each of the at least three rooms, a growing system comprising a plurality of vertical racks in each grow area within each of the first and second rooms, each vertical rack being configured to hold at least one growing container in which plants can be grown; and
   a preparation area disposed within at least a third room of each of the at least three rooms, the preparation area being disposed to service each grow area of the first and second rooms.

2. The system of claim 1, further comprising a control system coupled to the at least three rooms, the control system configured to control parameters within the grow area in the first room and the grow area in the second room, the parameters including one or more of temperature, humidity, $CO_2$ level, and light level.

3. The system of claim 2, wherein the control system is configured to control the parameters in each of the grow areas independently.

4. The system of claim 2, further comprising a misting system in communication with the control system and configured to provide humidity and water to each of the growing systems in the first and second rooms.

5. The system of claim 2, further comprising a lighting system in communication with the control system and configured to provide artificial light in of the grow areas in the first and second rooms.

6. The system of claim 2, further comprising a climate control system in communication with the control system and configured to control environmental conditions inside the at least three rooms.

7. The system of claim 2, further comprising a ventilation system in communication with the control system and configured to provide each of the grow areas in the first and second rooms with an air flow.

8. The system of claim 2, wherein the control system includes a control center disposed in one of the at least three rooms.

9. The system of claim 1, further comprising a control system coupled to the first and second rooms and configured to independently control parameters within the grow areas in each of the first and second rooms, the parameters selected from the group consisting of humidity, $CO_2$ level, temperature, air transfer, ultraviolet light level, grow light level, and mist level.

10. The system of claim 1, wherein the plurality of vertical racks is coupled to a conveyor for travel within the grow area in each of the first room and the second room, each conveyor providing user access to a crop from the preparation area.

11. The system of claim 1, wherein the at least one container comprises at least three containers, and the first room is disposed within a first of the containers, the second room is disposed with a second of the containers, and the third room is disposed within a third of the containers.

12. The system of claim 1, further comprising a plurality of dividers separating at least one of the one or more containers into two or more of the at least three rooms, one of the two or more rooms comprising the grow area, another of the two or more rooms comprising the preparation area.

13. The system of claim 1, further comprising an airlock operable to reduce contamination to each growing system from outside of the first and second rooms, wherein the airlock provides user access to the preparation area from outside of the third room.

14. A system for generating high-yield plant production, the system comprising:
   at least three rooms within one or more containers;
   a grow area disposed within each of at least a first room and a second room of the at least three rooms, a growing system comprising a plurality of vertical racks, wherein each of the vertical racks is suspended from a ceiling in the first and second rooms in each grow area, each vertical rack being configured to hold at least one growing container in which plants can be grown; and
   a preparation area disposed within at least a third room of the at least three rooms, the preparation area being disposed to service each grow area of the first and second rooms.

15. A system for generating high-yield plant production, the system comprising:
   at least three rooms within one or more containers;
   a grow area disposed within each of at least a first room and a second room of the at least three rooms, a growing system comprising a plurality of vertical racks in each grow area within the first and second rooms, each vertical rack being configured to hold at least one growing container in which plants can be grown;

a preparation area disposed within at least a third room of the at least three rooms, the preparation area being disposed to service each grow area of the first and second rooms;

a substrate preparation system within the preparation area configured to prepare raw substrate for pasteurization;

a pasteurization system within the preparation area configured to pasteurize fungi substrate; and an inoculation system within the preparation area configured to inoculate fungi substrate in each growing container with a fungi culture or fungi spawn.

* * * * *